(12) United States Patent
Seo et al.

(10) Patent No.: US 8,856,811 B2
(45) Date of Patent: Oct. 7, 2014

(54) DISK DRIVE APPARATUS AND CONVEYANCE ROLLER THEREOF

(75) Inventors: Jae-kab Seo, Suwon-si (KR); Won-youl Bae, Gwacheon-si (KR); Jae-hoon Sim, Yongin-si (KR); Byeng-bae Park, Ansan-si (KR); Ho-sun Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/343,232

(22) Filed: Jan. 4, 2012

(65) Prior Publication Data

US 2012/0174131 A1 Jul. 5, 2012

(30) Foreign Application Priority Data

Jan. 4, 2011 (KR) .................. 10-2011-0000513
Dec. 28, 2011 (KR) .................. 10-2011-0144585

(51) Int. Cl.
G11B 17/04 (2006.01)
G11B 17/051 (2006.01)
G11B 17/028 (2006.01)

(52) U.S. Cl.
CPC .......... *G11B 17/0404* (2013.01); *G11B 17/051* (2013.01); *G11B 17/0282* (2013.01); *G11B 17/0288* (2013.01)
USPC .......................................... 720/624; 720/690

(58) Field of Classification Search
USPC ................. 720/706, 608, 619–625, 632–635, 720/689–694
See application file for complete search history.

(56) References Cited

U.S. PATENT DOCUMENTS

| | | | | |
|---|---|---|---|---|
| 6,201,781 B1 * | 3/2001 | Abe | | 720/673 |
| 7,100,175 B2 * | 8/2006 | Nishidate | | 720/605 |
| 7,890,965 B2 * | 2/2011 | Kido | | 720/623 |
| 2001/0021156 A1 * | 9/2001 | Kikuchi et al. | | 369/77.1 |
| 2002/0067687 A1 * | 6/2002 | Kato | | 369/271 |
| 2005/0235300 A1 | 10/2005 | Kido | | |
| 2005/0283789 A1 * | 12/2005 | Iwaasa | | 720/690 |
| 2006/0085808 A1 * | 4/2006 | Fujimura | | 720/706 |
| 2008/0229345 A1 * | 9/2008 | Shukuya | | 720/620 |
| 2009/0282426 A1 * | 11/2009 | Chen | | 720/601 |
| 2010/0095313 A1 * | 4/2010 | Chen | | 720/621 |

FOREIGN PATENT DOCUMENTS

EP 0666562 A2 1/1995

OTHER PUBLICATIONS

Communication dated Sep. 5, 2013, issued by the European Patent Office in corresponding Application No. 11196249.4.

* cited by examiner

Primary Examiner — Adam B Dravininkas
(74) Attorney, Agent, or Firm — Sughrue Mion, PLLC

(57) ABSTRACT

A disk drive apparatus is provided. The disk drive apparatus includes: a frame which includes a slot to insert a disk therethrough; a spindle motor assembly which includes a turntable including a disk seating part and a chucking member, and a spindle motor to rotate the turntable; a traverse assembly which mounts the spindle motor thereon and is movable in a direction perpendicular to an inserting direction of the disk; a conveyance roller which is movable between a contact position and a non-contact position with the disk and conveys the disk using a friction force; and a roller driving unit which moves the conveyance roller from the non-contact position to the contact position after an unchucking operation of the disk is completed, when the disk is unloaded.

22 Claims, 30 Drawing Sheets

DISK DRIVE APPARATUS AND CONVEYANCE ROLLER THEREOF

CROSS-REFERENCE TO RELATED APPLICATION

This application claims priority from Korean Patent Application No. 10-2011-0000513 filed on Jan. 4, 2011 and Korean Patent Application No. 10-2011-0144585 filed on Dec. 28, 2011 in the Korean Intellectual Property Office, the disclosures of which are incorporated herein by reference in their entirety.

BACKGROUND

1. Field

Methods and apparatuses consistent with exemplary embodiments relate to a disk drive apparatus, and more particularly, to an optical disk drive apparatus of a slot-in type.

2. Description of the Related Art

In general, a disk drive apparatus refers to an apparatus that records information on a disk such as a compact disk (CD), a digital versatile disk (DVD), and a blue-ray disk (BD), or reproduces recorded information.

The disk may be inserted into the disk drive apparatus by being supported on a tray or through a slot. The disk drive apparatus using the slot is generally referred to as a slot-in type disk drive apparatus.

The disk inserted into the disk drive apparatus is seated on a turntable and is rotated along with the turntable. As means for safely seating the disk on the turntable, a magnet clamp using a magnetic force or a spring clamp using an elastic force of a spring is generally used. Such a magnet clamp or a spring clamp is generally disposed on an upper portion of the turntable of the disk drive apparatus. Therefore, if these types of clamps are mounted in the disk drive apparatus, an entire thickness of the disk drive apparatus unavoidably increases.

In recent years, a self-chucking method has been used. The self-chucking method automatically chucks the disk onto the turntable by moving up and down the turntable without using a clamp such as a magnet clamp or a spring clamp. The disk drive apparatus using the self-chucking method is slimmer than those using the clamp.

However, if the self-chucking method is applied to the disk drive apparatus of the slot-in type, there is a problem that the disk may be caught in the turntable when being unloaded.

SUMMARY

One or more exemplary embodiments may overcome the above disadvantages and other disadvantages not described above. However, it is understood that one or more exemplary embodiment are not required to overcome the disadvantages described above, and may not overcome any of the problems described above.

One or more exemplary embodiments provide a disk drive apparatus of a slot-in type which can be slim by applying a self-chucking method and also can solve a problem that a disk may be caught in a turntable.

According to an aspect of an exemplary embodiment, there is provided a slot-in type disk drive apparatus, including: a frame which includes a slot to insert a disk therethrough; a spindle motor assembly which includes a turntable including a disk seating part and a chucking member, and a spindle motor to rotate the turntable; a traverse assembly which mounts the spindle motor thereon and is movable up and down; a conveyance roller which is movable between a contact position and a non-contact position with the disk and conveys the disk using a friction force; and a roller driving unit which moves the conveyance roller from the non-contact position to the contact position after an unchucking operation of the disk is completed, when the disk is unloaded.

The roller driving unit may move the conveyance roller from the contact position to the non-contact position after a chucking operation of the disk is completed, when the disk is loaded.

The roller driving unit may include a roller support member which is pivotably disposed on the frame and supports the conveyance roller, a upper rotary member which is rotated in a clockwise or a counter clockwise direction and rotates the roller support member, a lower rotary member which is disposed under the upper rotary member and rotates the upper rotary member; and a sliding member which reciprocates linearly and rotates the lower rotary member.

The upper rotary member may include a rotary body, and a pressing projection which protrudes from the rotary body and rotates the roller support member.

The pressing projection may include a horizontal surface which is disposed horizontally, and an inclined surface which is connected to the horizontal surface and is inclined with respect to the horizontal surface.

A buffer recess curving inwardly may be formed on the rotary body of the upper rotary member.

The lower rotary member may include a rotary body, and a pressing protrusion which protrudes from the rotary body and rotates the upper rotary member.

The pressing protrusion of the lower rotary member may be placed in the buffer recess of the upper rotary member.

A width of the buffer recess may be larger than a width of the pressing protrusion.

A circumferential gear may be on the rotary body of the lower rotary member.

The sliding member may include a sliding body which reciprocates linearly, an ascending and descending guide plate which is disposed on one side of the sliding body and guides an ascending and descending movement of the traverse assembly, and a spur gear which is disposed on the other side of the sliding body and rotates the lower rotary member.

An ascending and descending protrusion may be disposed on one end of the traverse assembly and an ascending and descending guide recess may be formed on the ascending and descending guide plate to guide a movement of the ascending and descending protrusion.

The roller support member may include a pivot body which is pivotable, a pair of roller support parts which are disposed on opposite ends of the pivot body, and a pivoting piece which is disposed on one side of the pivot body and is pressed by the upper rotary member.

Each of the roller support parts may include a roller receiving recess which receives one end of the conveyance roller, and a shaft insertion hole through which a rotary shaft provided on the frame is inserted.

The frame may include a base frame to contain a plurality of parts of the disk driving apparatus and a cover frame to cover the base frame, a downward pressing member may be disposed on an inside surface of the cover frame to downwardly press a center portion of the disk when the disk is chucked onto the chucking member, and an upward pressing member may be disposed on the base frame to upwardly press the center portion of the disk when the disk is unchucked from the chucking member.

The downward pressing member may have a ring shape and the upward pressing member may have a rod shape.

When the disk is loaded, the traverse assembly may ascend from a first position which is lowest to a second position which is highest and where the disk is chucked onto the chucking member, and then descend to a third position which is a disk play position between the first position and the second position.

When the disk is unloaded, the traverse assembly may ascend from the third position to the second position and then descend to the first position.

When the traverse assembly is placed in a fourth position between the second position and the third position during the loading of the disk, a chucking operation of the disk may be completed.

When the traverse assembly is placed in a fifth position between the second position and the first position during the unloading of the disk, an unchucking operation of the disk may be completed.

The roller driving unit may include: a roller support member which is pivotably disposed on the frame and supports the conveyance roller, a cam member which is rotated in a clockwise direction or a counter clockwise direction and pivotably drives the roller support member, and a sliding member which reciprocates linearly and rotates the cam member.

The cam member may include: a rotary body, a pressing projection which protrudes upwardly from the rotary body and pivotably drives the roller support member, and a cam protrusion which protrudes from the rotary body in parallel and receives rotational force from the sliding member.

The pressing projection may include: a horizontal surface, and an inclined surface which is connected to the horizontal surface and is inclined with respect to the horizontal surface.

The sliding member may include: a sliding body which reciprocates linearly, an ascending and descending guide plate which is disposed on a side of the sliding body and guides an ascending movement and a descending movement of the traverse assembly, and a cam driving part which is disposed on the other side of the sliding body and rotates the cam member.

The cam driving part may include a cam driving body which is connected to the sliding body and reciprocates with the sliding body, and a buffer recess may be provided on a corner of the cam driving body and receives the cam protrusion, and a width of the buffer recess may be larger than a width of the cam protrusion.

The buffer recess may include: a first contact end which is brought into contact with a first side end of the cam protrusion when the disk is loaded, a second contact end which is brought into contact with a second side end of the cam protrusion when the disk is unloaded, and an inner end which is disposed between the first contact end and the second contact end and may include a recess forming protrusion.

The buffer recess may further include a cam protrusion restraining recess which is disposed between the second contact end and the recess forming protrusion.

The buffer recess may further include a cam protrusion escaping recess which is disposed between the first contact end and the recess forming protrusion.

BRIEF DESCRIPTION OF THE DRAWING FIGURES

The above and/or other aspects will be more apparent by describing in detail exemplary embodiments, with reference to the accompanying drawings, in which.

DETAILED DESCRIPTION OF EXEMPLARY EMBODIMENTS

Figure 1:
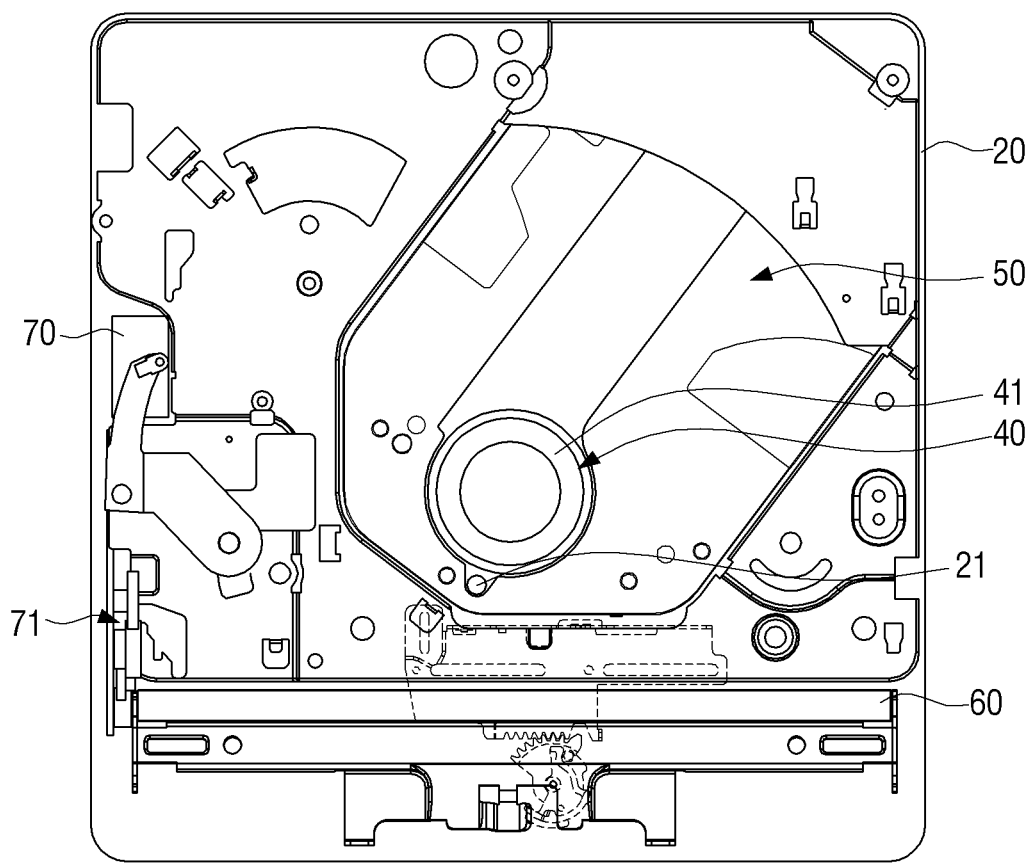
FIG. 1 is a plane view illustrating a disk drive apparatus from which a cover frame is removed according to an exemplary embodiment.

Hereinafter, exemplary embodiments will be described in greater detail with reference to the accompanying drawings.

In the following description, same reference numerals are used for the same elements when they are depicted in different drawings. The matters defined in the description, such as detailed construction and elements, are provided to assist in a comprehensive understanding of exemplary embodiments. Thus, it is apparent that exemplary embodiments can be carried out without those specifically defined matters. Also, functions or elements known in the related art are not described in detail since they would obscure the exemplary embodiments with unnecessary detail.

FIG. 1 is a plane view illustrating a disk drive apparatus 1 from which a cover frame is removed according to an exemplary embodiment.

Referring to FIG. 1, a disk drive apparatus 1 according to an exemplary embodiment is an optical disk drive apparatus to which an optical disk D such as a CD, a DVD, and a BD is applied. The disk drive apparatus 1 includes a frame 10 (see FIG. 2) which includes a base frame 20 containing a plurality of parts and a cover frame 30 covering an upper portion of the base frame 20. A slot (not shown) is formed on one side of the frame 10 to allow a disk D to enter or exit from the frame 10. In other words, the disk drive apparatus 1 of FIG. 1 is a slot-in type disk drive apparatus into which a disk D is loaded in a slot-in method.

The disk drive apparatus 1 further includes a spindle motor assembly 40, a traverse assembly 50, and a conveyance roller 60.

The spindle motor assembly 40 includes a turntable 41 to support the disk D and a spindle motor (not shown) to rotatably drive the turntable 41. As shown in FIG. 2, the turntable 41 includes a disk seating part 43 on which the disk D is seated and a chucking member 42 to chuck the disk D in order to maintain the disk D seated on the disk seating part 43. The chucking member 42 has a protrusion formed along an outer edge thereof to be locked into a center hole H (see FIG. 2) of the disk. The spindle motor rotates the turntable 41 on which the disk D is seated at a constant speed in a play mode.

The traverse assembly 50 has a plate shape and is disposed in a diagonal direction of the disk drive apparatus 1. The spindle motor assembly 40 and an optical pickup (not shown) to record or read out information on or from the disk D are mounted on the traverse assembly 50. The traverse assembly 50 is movable upwardly and downwardly (i.e., in a direction perpendicular to a planar surface of a loaded disk D). Accordingly, when the disk D is loaded or unloaded, the traverse assembly 50 moves up and down along with the spindle motor assembly 40 and the optical pickup.

The conveyance roller 60 is disposed in parallel with one side of the base frame 20 and applies a friction force to the disk D when the disk D is loaded or unloaded, thereby conveying the disk D. The base frame 20 is provided with a roller driving motor 70 to provide a rotational force to the conveyance roller 60 and a gear train 71 to transfer the rotational force generated by the roller driving motor 70 to the conveyance roller 60.

The base frame 20 is provided with an upward pressing member 21 disposed adjacent to the turntable 41. The upward pressing member 21 presses the disk D upwardly when the disk D is unchucked and a detailed description thereof will be provided below.

In the case of the disk drive apparatus 1 according to the present exemplary embodiment, the disk D is mounted on the turntable 41 in a self-chucking method. Referring to FIG. 2 and FIG. 3, the self-chucking method performed in the present exemplary embodiment will be explained.

Figure 2A:
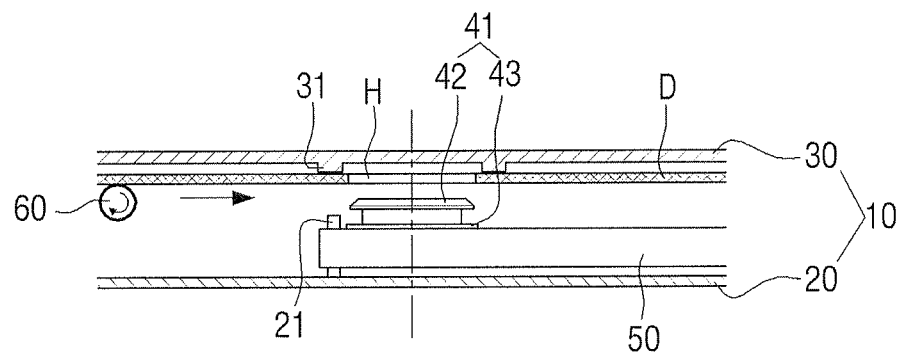
FIGS. 2A to 2C are schematic cross-section views sequentially illustrating a process of loading a disk into the disk drive apparatus of FIG. 1.
Figure 2B:
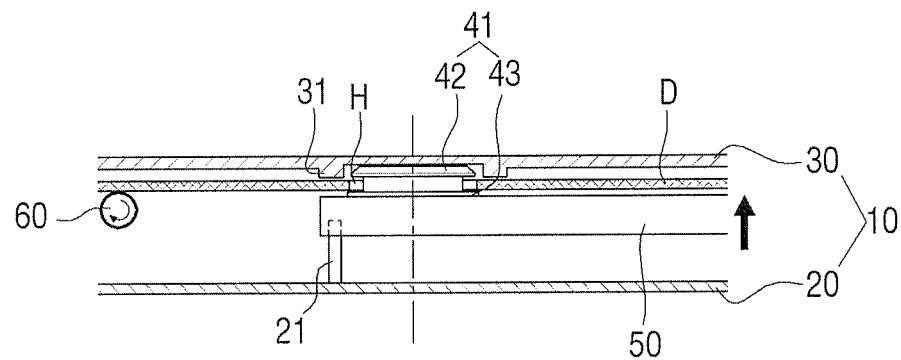
Figure 2C:
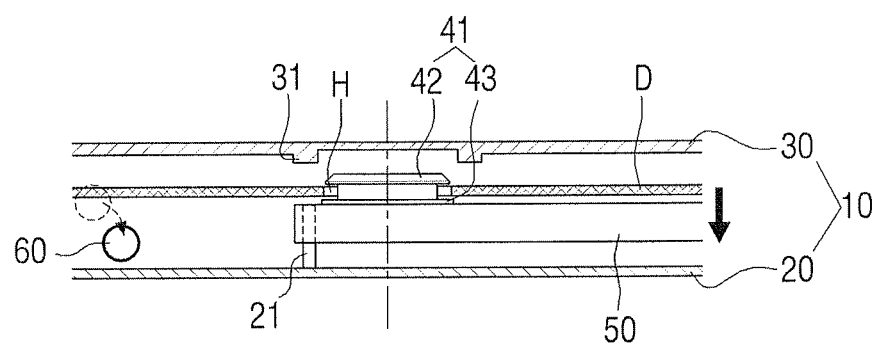

Referring to FIGS. 2A to 2C, a loading process will be explained first. FIGS. 2A to 2C are schematic cross-section views sequentially illustrating a process of loading a disk into the disk drive apparatus 1 of FIG. 1.

As shown in FIG. 2A, a disk D inserted into the disk drive apparatus 1 is conveyed to the inside of the disk drive apparatus 1 by the conveyance roller 60, which rotates in a clockwise direction in the present exemplary embodiment, such that the disk D is placed in a chucking position. In the chucking position, the center hole H of the disk D is positioned above the turntable 41.

As shown in FIG. 2B, if the traverse assembly 50 moves up by a predetermined distance after the disk D is placed in the chucking position, the disk D is pressed downwardly by a downward pressing member 31, which is disposed on an inside surface of the cover frame 30, and the chucking member 42 of the turntable 41 is locked into the center hole H of the disk D. In other words, the disk D is chucked onto the chucking member 42 of the turntable 41. The downward pressing member 31 according to an exemplary embodiment is a ring member made of a rubber material, though it is understood that another exemplary embodiment is not limited thereto.

Meanwhile, as shown in FIG. 2B the conveyance roller 60 is maintained in a contact position with the disk D until the chucking of the disk D is completed. If the conveyance roller 60 moves away from the disk D before the chucking of the disk is completed, the disk D may deviate from the chucking position and thus the chucking of the disk D may not be smoothly performed. Therefore, according to the present exemplary embodiment, the conveyance roller 60 is maintained in the contact position with the disk D while rotating until the chucking of the disk D is completed.

As shown in FIG. 2C, if the chucking of the disk D has been completed, the conveyance roller 60 stops rotating and moves to a non-contact position with the disk D and the traverse assembly 50 moves down by a predetermined distance and enters a play mode. In the play mode, the turntable 41 is rotated by the spindle motor (not shown). At that time, information is recorded on or reproduced from the disk D seated on the turntable 41.

Figure 3A:
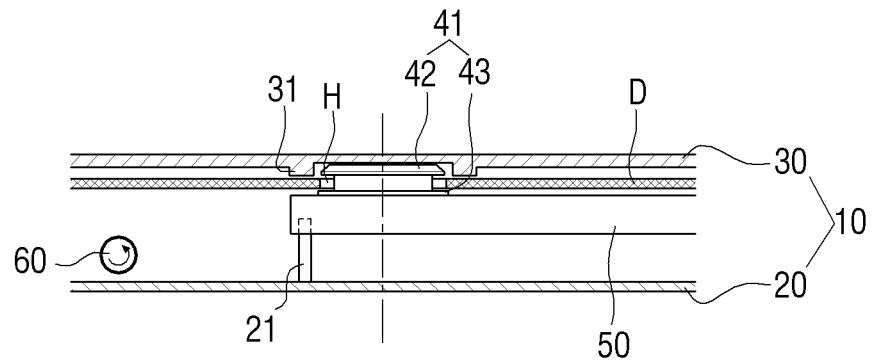
FIGS. 3A to 3C are schematic cross-section views sequentially illustrating a process of unloading the disk from the disk drive apparatus of FIG. 1.
Figure 3B:
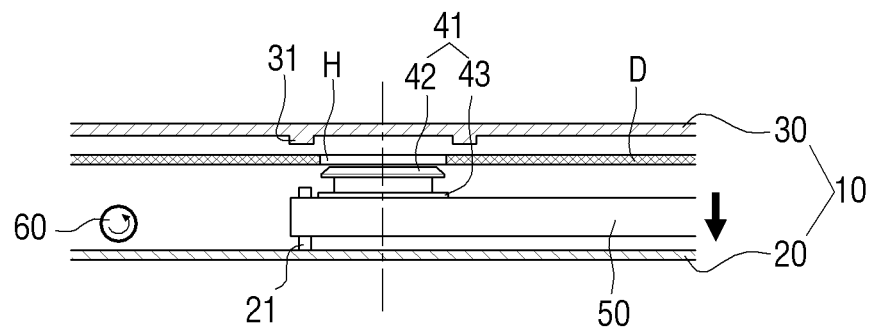
Figure 3C:
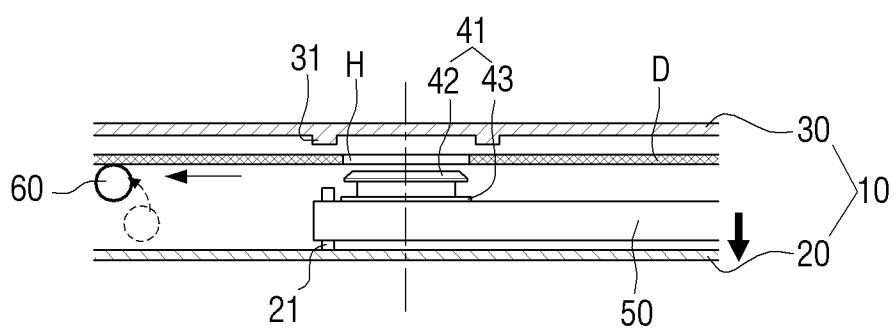

Next, referring to FIGS. 3A to 3C, an unloading process will be explained. FIGS. 3A to 3C are schematic cross-section views sequentially illustrating a process of unloading the disk from the disk drive apparatus 1 of FIG. 1.

As shown in FIG. 3A, if a user presses an eject button, the conveyance roller 60 rotates in a counter clockwise direction and the traverse assembly 50 moves up by a predetermined distance.

As shown in FIG. 3B, if the traverse assembly 50 moves down by a predetermined distance after moving up, the disk D is upwardly pressed by the upward pressing member 21 of the base frame 20 and thus is unchucked from the chucking member 42 of the turntable 41. The upward pressing member 21 may be a rod- or protrusion-shaped member which is fixedly disposed on the base frame 20. Accordingly, the disk D seated on the turntable 20 is brought into contact with an upper end of the upward pressing member 21 when the disk D moves down. In this state, if the traverse assembly 50 further moves down, the disk D is upwardly pushed by the upward pressing member 21 and is unchucked.

The conveyance roller 60 is still placed in the non-contact position with the disk until the unchucking of the disk D is completed. If the conveyance roller 60 is brought into contact with the disk D before the unchucking of the disk D is completed, the chucking member 42 of the turntable 41 may be caught in the center hole D of the disk D when the disk D is discharged from the frame 10 by the conveyance roller 60 after being unchucked. In other words, a problem that the disk D may be caught in the turntable 41 may occur. Therefore, in the present exemplary embodiment, the conveyance roller 60 is distanced away from the disk D until the unchucking of the disk D is completed.

More specifically, albeit not shown, a positioning member such as a guide lever may be disposed in the frame 10 and is brought into contact with an inner edge of the disk D when the disk D is loaded or unloaded and correctly positions the disk D. The unchucked disk D may be slightly pushed toward the slot by the positioning member (in a leftward direction in (FIG. 3B). In the present exemplary embodiment, at a time when the conveyance roller 60 is brought into contact with the disk D after the disk D has been unchucked, the disk D has been already pushed toward the slot by the positioning member. In this state, even if the conveyance roller 60 discharges the disk D, the disk D is not caught in the chucking member 42.

As shown in FIG. 3C, if the unchucking of the disk D has been completed, the conveyance roller 60 moves to the contact position with the disk D and thus discharges the disk D out of the frame 10, and the traverse assembly 50 slightly moves down and enters a standby mode to wait for the insertion of the disk D.

As described above with reference to FIGS. 2A to 2C and FIGS. 3A to 3C, the disk drive apparatus 1 according to an exemplary embodiment achieves the chucking and unchucking of the disk D by the self-chucking method which does not use a clamp such as a magnet clamp or a spring clamp. Accordingly, since the disk drive apparatus 1 has no clamp provided on an upper portion of the turntable 41, the disk drive apparatus 1 can be slim in comparison with related art disk drive apparatuses using a clamp. For example, a thickness of the disk drive apparatus 1 may be reduced to 15 mm or less.

Also, as described above, during the disk loading process, the conveyance roller 60 is maintained in the contact position with the disk D until the chucking of the disk D is completed so that malfunction can be prevented in chucking the disk D. Also, during the disk D unloading process, the conveyance roller 60 is maintained in the non-contact position with the disk D until the unchucking of the disk is completed so that the problem that the disk D may be caught during a disk discharging operation can be prevented.

As described above, the conveyance roller 60 may be in contact with the disk D or be distanced from the disk D in a timely manner when the disk D is loaded or unloaded. The operation of bringing the conveyance roller 60 into contact with the disk D or distancing the conveyance roller 60 from the disk D may be performed by a roller driving unit 100 mechanically.

Figure 4:
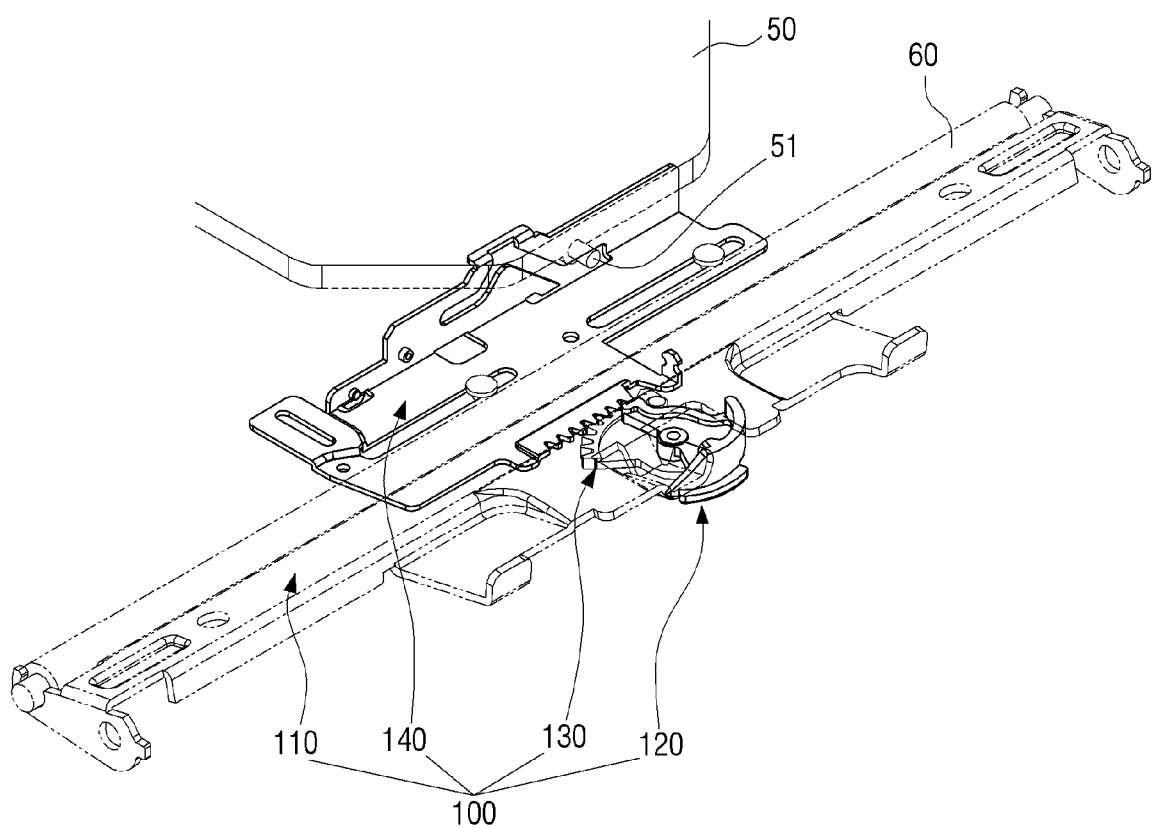
FIG. 4 is a view illustrating a roller driving unit which is provided in the disk drive apparatus of FIG. 1.
Figure 5:
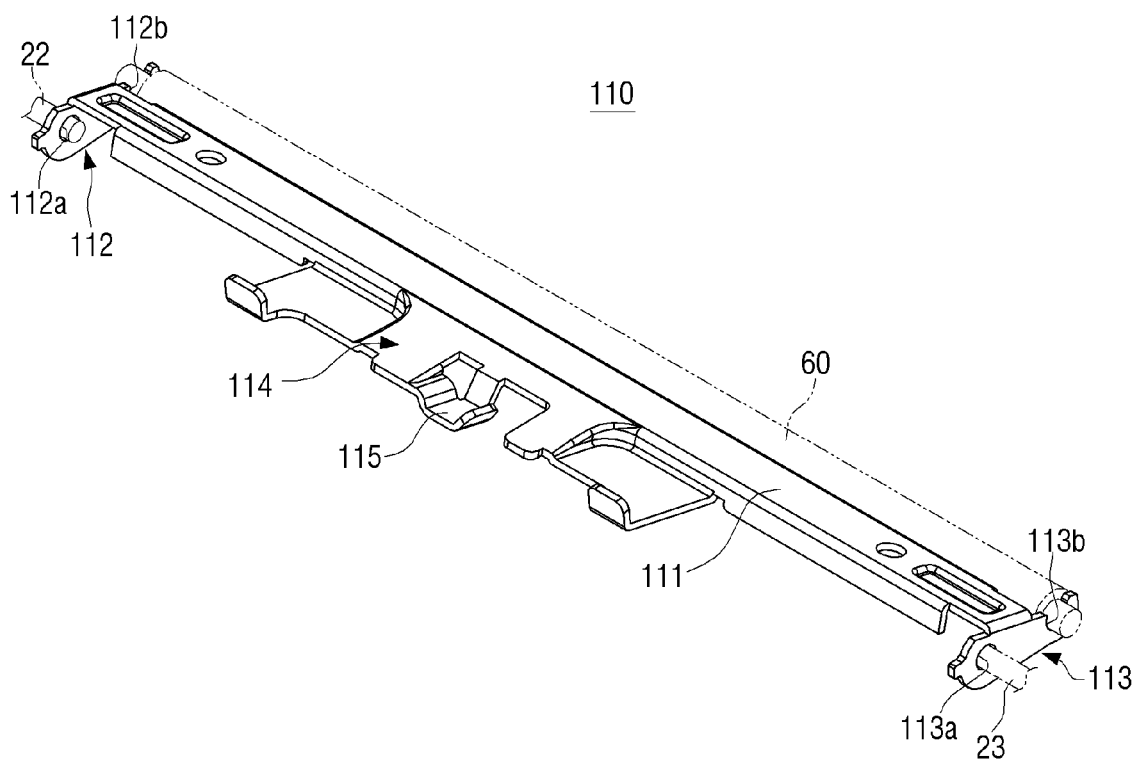
FIG. 5 is a view illustrating a roller support member which is provided in the roller driving unit of FIG. 4.
Figure 6:
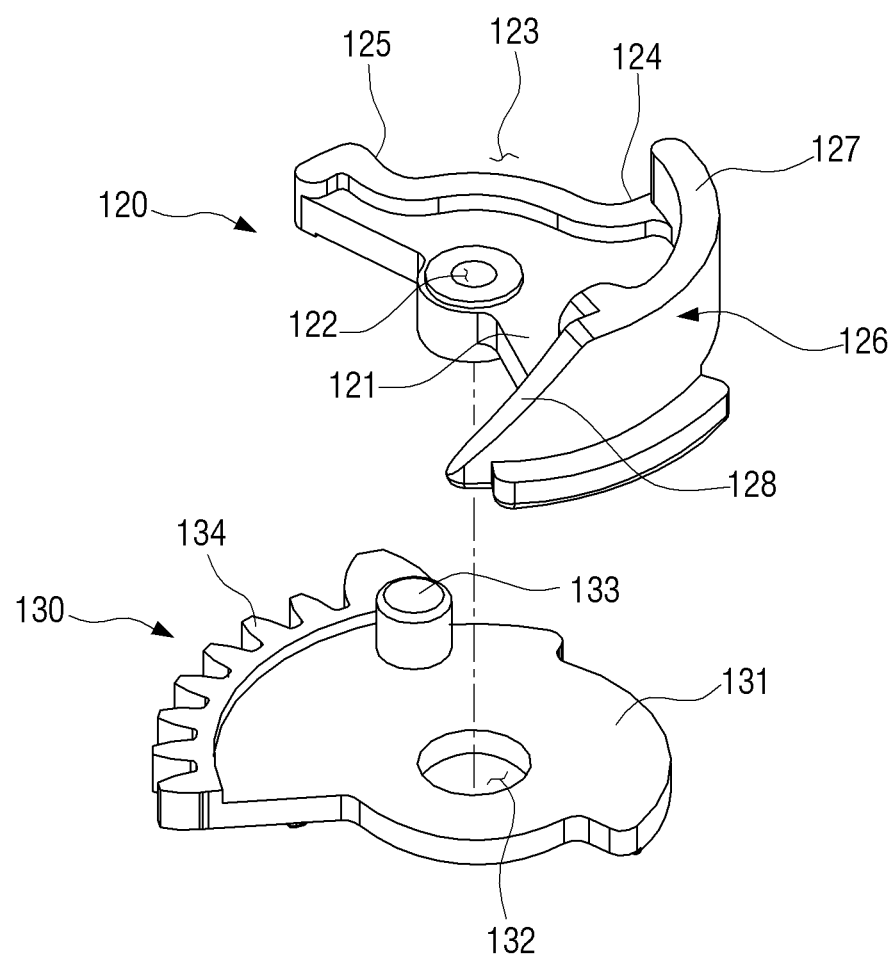
FIG. 6 is a view illustrating an upper roller member and a lower roller member which are provided in the roller driving unit of FIG. 4.
Figure 7:
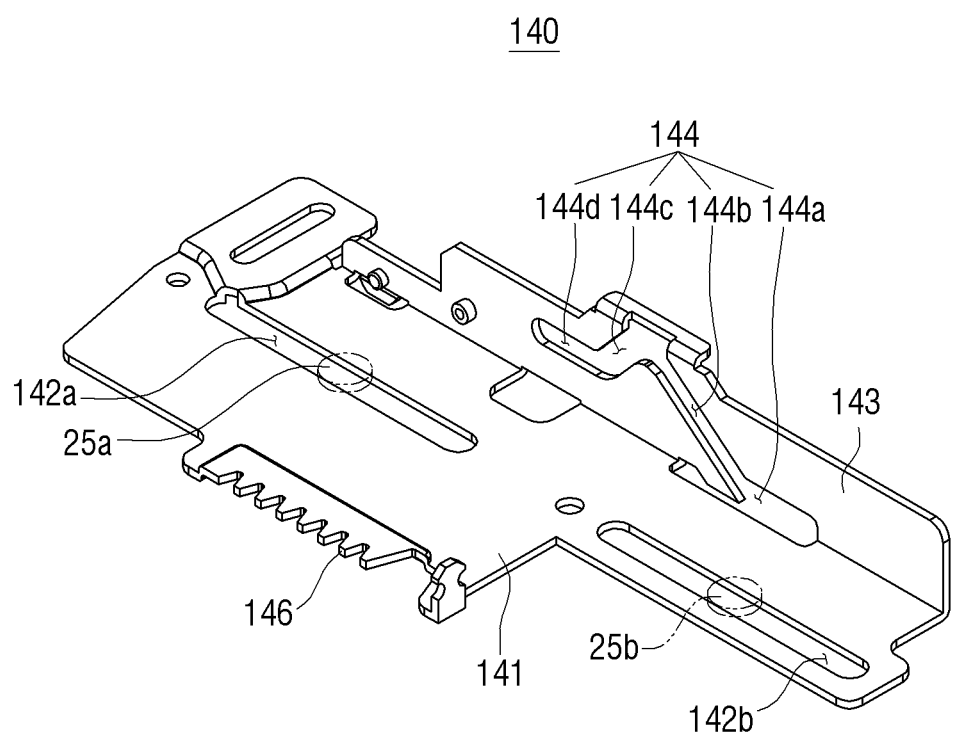
FIG. 7 is a view illustrating a sliding member which is provided in the roller driving unit of FIG. 4.

Referring to FIGS. 4 to 7, the roller driving unit 100 will be explained below. FIG. 4 is a view illustrating the roller driving unit 100 provided in the disk drive apparatus 1 of FIG. 1, FIG. 5 is a view illustrating a roller support member 110 provided in the roller driving unit 100 of FIG. 4, FIG. 6 is a view illustrating an upper rotary member and a lower rotary member provided in the roller driving unit 100 of FIG. 4, and FIG. 7 is a view illustrating a sliding member 140 provided in the roller driving unit 100 of FIG. 4.

Referring to FIG. 4, the roller driving unit 100 provided in the disk drive apparatus 1 according to an exemplary embodiment includes a roller support member 110, an upper rotary member 120, a lower rotary member 130, and a sliding member 140.

Referring to FIGS. 4 and 5, a roller support member 110 according to an exemplary embodiment will be explained. The roller support member 110 includes a pivot body 111, a pair of roller support parts 112, 113, and a rear protrusion part 114.

The pivot body 111 has a substantially rectangular plate shape. The pair of roller support parts 112, 113 are provided at opposite ends of the pivot body 111 formed (i.e., provided) lengthwise. Roller receiving recesses 112b, 113b and shaft insertion holes 112a, 113a are formed on the roller support parts 112, 113. Opposite ends of the conveyance roller 60 are received in the roller receiving recesses 112b, 113b such that the conveyance roller 60 is supported by the roller support member 110. Rotary shafts 22, 23 of the base frame 20 are inserted (i.e., provided) into the shaft insertion holes 112a, 113b.

A pivoting piece 115 is formed on the rear protrusion part 114. If the pivoting piece 115 is upwardly pressed by the upper rotary member 120, the pivot body 111 pivots on the rotary shafts 22, 23. At that time, the conveyance roller 60 being supported by the roller support parts 112, 113 moves down and is placed in the non-contact position with the disk D (distanced away from the disk D). On the other hand, if the pivoting piece 115 is not pressed by the upper rotary member 120, the conveyance roller 60 is placed in the contact position with the disk D.

Referring to FIGS. 4 and 6, the upper rotary member 120 and the lower rotary member 130 will be explained.

The upper rotary member 120 includes a rotary body 121 and a pressing projection 126.

The rotary body 121 is rotatable about the rotary shaft (not shown) inserted into the shaft insertion hole 122 in a clockwise or a counter clockwise direction. The pressing projection 126 is integrally formed with a circumference of the rotary body 121 and has a horizontal surface 127 formed horizontally and an inclined surface 128 inclined with respect to the horizontal surface 127. The above-described pivoting piece 115 of the roller support member 110 (see FIG. 5) may be lifted upwardly by the pressing projection 126 of the upper rotary member 120. In other words, if the pivoting piece 115 of the roller support member 110 is placed on the pressing projection 126 of the upper rotary member 120, the pivoting piece 115 is upwardly pressed by the pressing projection 126 and the conveyance roller 60 being supported by the roller support member 110 is placed in the non-contact position with the disk D. On the other hand, if the pivoting piece 115 of the roller support member 110 is not placed on the pressing projection 126 of the upper rotary member 120, the conveyance roller 60 being supported by the roller support member 110 is placed in the contact position with the disk D.

A buffer recess 123 which curves inwardly is formed on the circumference of the rotary body 121 of the upper rotary member 120. The buffer recess 123 includes a first contact surface 124 and a second contact surface 125. A pressing protrusion 133 of the lower rotary member 130 is placed in the buffer recess 123.

The lower rotary member 130 includes a rotary body 131 and the pressing protrusion 133. The rotary body 131 is rotatable about the rotary shaft (not shown) inserted into the shaft insertion hole 132 in a clockwise or counter clockwise direction. Referring to FIG. 6, the same rotary shaft may be inserted into the shaft insertion hole 122 of the upper rotary member 120 and the shaft insertion hole 132 of the lower rotary member 130. In other words, the lower rotary member 130 has the same rotary shaft as the upper rotary member 120. A circumferential gear 134 is formed along a circumference of the rotary body 131. The circumferential gear 134 of the lower rotary member 130 is engaged with a spur gear 146 of the sliding member 140, which will be explained below (see FIG. 7), and thus the lower rotary member 130 is rotated in the clockwise or counter clockwise direction when the sliding member 140 reciprocates.

The pressing protrusion 133 of the lower rotary member 130 is placed in the buffer recess 123 of the upper rotary member 120. If the pressing protrusion 133 presses the first contact surface 124 of the buffer recess 123, the upper rotary member 120 is rotated in the clockwise direction, and, if the pressing protrusion 133 presses the second contact surface 125 of the buffer recess 123, the upper rotary member 120 is rotated in the counter clockwise direction.

As shown in FIG. 6, a distance between the first contact surface 124 and the second contact surface 125 of the buffer recess 123 is larger than a diameter of the pressing protrusion 133. Accordingly, the pressing protrusion 133 may neither contact the first contact surface 124 nor the second contact surface 125 of the buffer recess 123 while the lower rotary member 130 is being rotated. In this case, the lower rotary member 130 is rotated, whereas the upper rotary member 120 is not rotated. In other words, when the lower rotary member 130 is rotated, the upper rotary member 120 is rotated together with the lower rotary member 130 or is maintained in an idle state.

The sliding member 140 will now be explained with reference to FIGS. 4 and 7.

The sliding member 140 includes a sliding body 141 and an ascending and descending guide plate 143.

The sliding body 141 has a plate shape and has two sliding guide holes 142a, 142b formed in a lengthwise direction. Pin members 25a, 25b of the base frame 20 are inserted into the sliding guide holes 142a, 142b such that linearly reciprocal movement of the sliding body 141 is guided. The spur gear 146 is formed on one lengthwise end of the sliding body 141. The spur gear 146 is engaged with the circumferential gear 134 of the lower rotary member 130 described above. Accordingly, when the sliding member 140 reciprocates in a horizontal direction, the lower rotary member 130 is rotated in the clockwise or the counter clockwise direction.

The ascending and descending guide plate 143 has a plate shape. The ascending and descending guide plate 143 is integrally formed with the other lengthwise end of the sliding body 141 and is perpendicular to the sliding body 141. An ascending and descending guide recess 144 having variable heights is formed on the ascending and descending guide plate 143. As shown in FIG. 4, an ascending and descending protrusion 51 formed on one end of the traverse assembly 50 is inserted into the ascending and descending guide recess 144. Accordingly, when the sliding member 140 linearly moves in the horizontal direction, the ascending and descending protrusion 51 moves up and down and thus the traverse assembly 50 connected with the ascending and descending protrusion 51 moves up and down.

The ascending and descending guide recess 144 has four continuous sections. More specifically, the ascending and descending guide recess 144 has a first guide recess 144a, a second guide recess 144b, a third guide recess 144c, and a fourth guide recess 144d.

When the disk D is loaded, the traverse assembly 50 ascends to a second position, which is highest, from a first position (standby position), which is lowest, and then descends to a third position which is a middle level of height (disk display position). When the disk D is unloaded, the traverse assembly 50 ascends to the second position from the third position and then descends to the first position. The ascending and descending protrusion 51 of the traverse assembly 50 experiences the same height change as the traverse assembly 50 during the loading and unloading of the disk D. The first guide recess 144a receives the ascending and descending protrusion 51 in the first position, the second guide recess 144b guides the ascending and descending movement of the ascending and descending protrusion 51 between the first position and the second position, the third guide recess 144c guides the ascending and descending movement of the ascending and descending protrusion 51 between the second position and the third position, and the fourth guide recess 144d receives the ascending and descending protrusion 51 in the third position.

Figure 8:
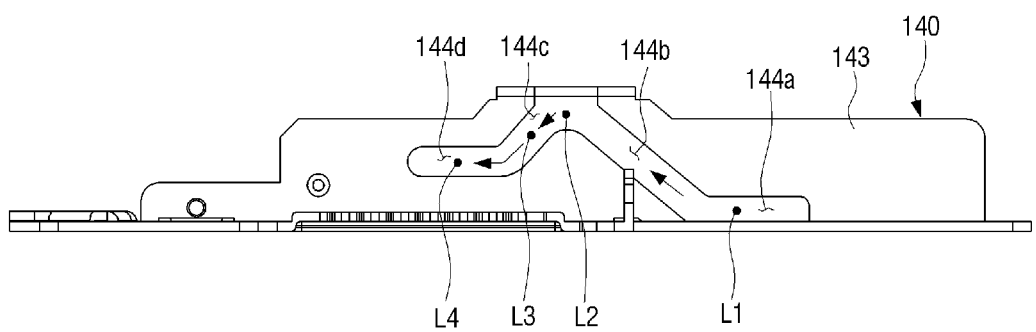
FIG. 8 is a side view of the sliding member to explain movement of an ascending and descending protrusion when a disk is loaded according to an exemplary embodiment.

Referring to FIG. 8 and FIGS. 9A to 9D, an operation of the roller driving unit 100 (see FIG. 4) when the disk D is loaded will be explained below. FIG. 8 is a side view illustrating the sliding member 140 to explain the movement of the ascending and descending protrusion 51 when the disk D is loaded, and FIGS. 9A to 9D are plane views schematically illustrating an operation of the roller driving unit 100 when the disk D is loaded.

As shown in FIG. 8, as the sliding member 140 moves to the right when the disk D is loaded, the ascending and descending protrusion 51 (see FIG. 4) of the traverse assembly 50 moves from an initial position L1 and reaches a position L4 through positions L2 and L3.

Figure 9A:
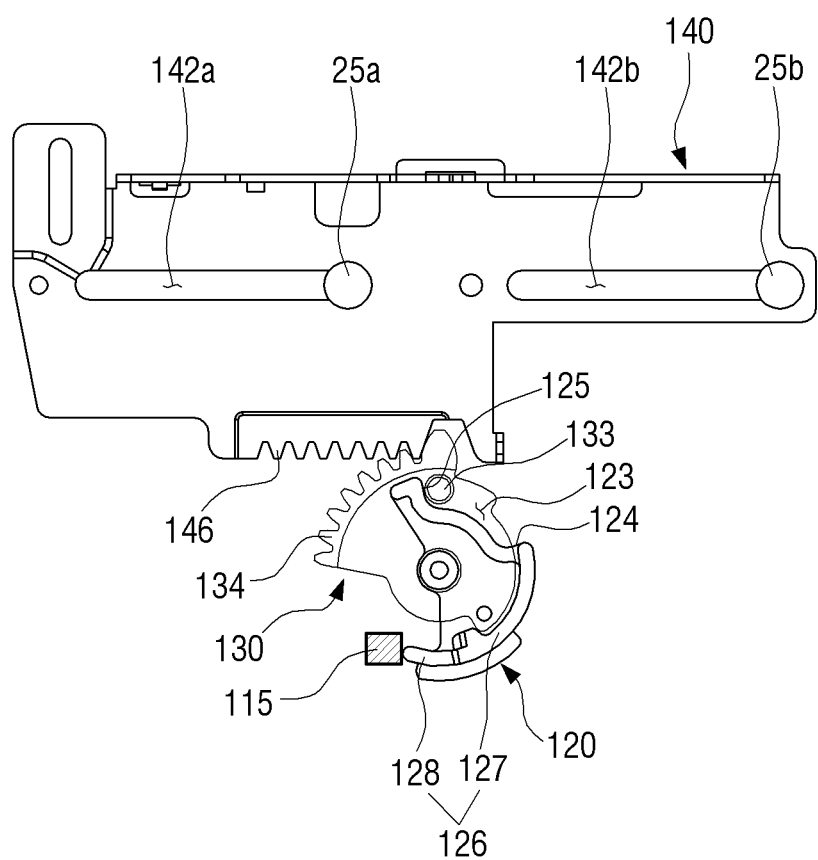
FIGS. 9A to 9D are plane views sequentially illustrating an operation of a roller driving unit when a disk is loaded according to an exemplary embodiment.

Referring to FIG. 9A illustrating the case where the ascending and descending protrusion 51 is placed in the position L1, the ascending and descending protrusion 51 of the traverse assembly 50 is received in the first guide recess 144a of the sliding member 140 at the lowest position when the disk drive apparatus 1 is in a standby mode, i.e., before the disk D is inserted. At that time, the pressing protrusion 133 of the lower rotary member 130 is adjacent to the second contact surface 125 of the buffer recess 123 of the upper rotary member 120. Also, the pivoting piece 115 of the roller support member 110 (see FIG. 5) is not being pressed by the pressing projection 120 of the upper rotary member 120. Accordingly, when the ascending and descending protrusion 51 is placed in the lowest position L1, the conveyance roller 60 being supported by the roller support member 110 is placed in a position where the conveyance roller 60 may contact the disk D (contact position).

Figure 9B:
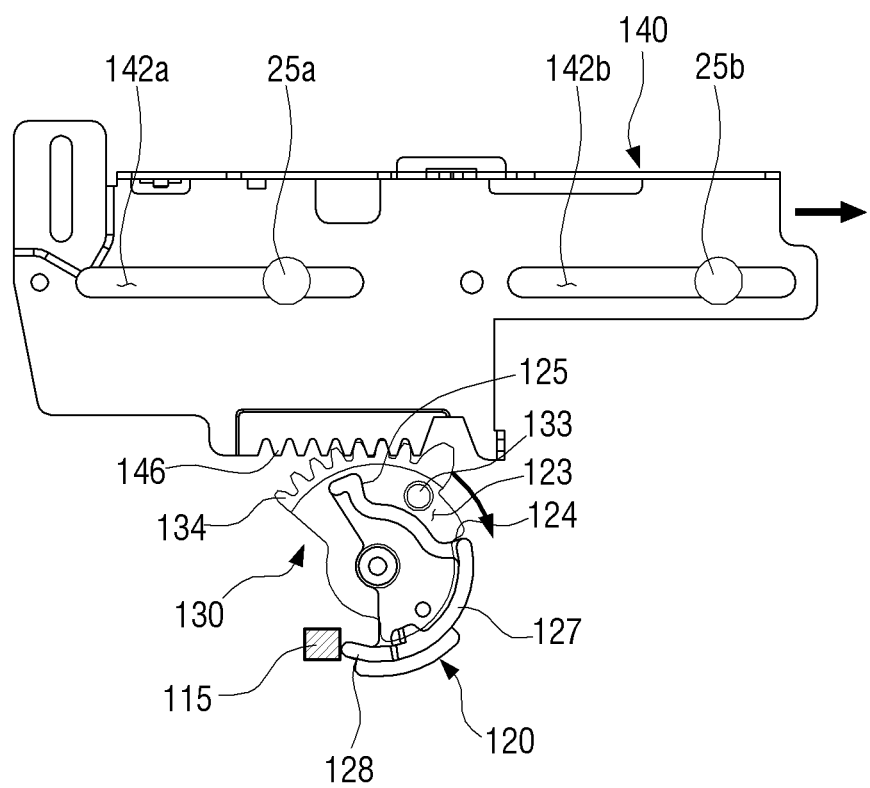

Referring to FIG. 9B illustrating the case where the ascending and descending protrusion 51 is placed in the position L2, the chucking of the disk D is completed when the ascending and descending protrusion 51 is placed in the highest position L2 (B) of FIG. 2 illustrates the disk D which has been chucked). The lower rotary member 130 is being rotated by the sliding member 140 in the clockwise direction. On the other hand, the pressing protrusion 133 of the lower rotary member 130 is not in contact with the first contact surface 124 of the buffer recess 123 of the upper rotary member 120 and thus the upper rotary member 120 maintains the idle status. Also, the pressing projection 126 of the upper rotary member 120 does not press the pivoting piece 115 of the roller support member 110. Accordingly, the conveyance roller 160 being supported by the roller support member 110 is still maintained in the contact position with the disk D at the position L2 where the chucking of the disk D is completed.

Figure 9C:
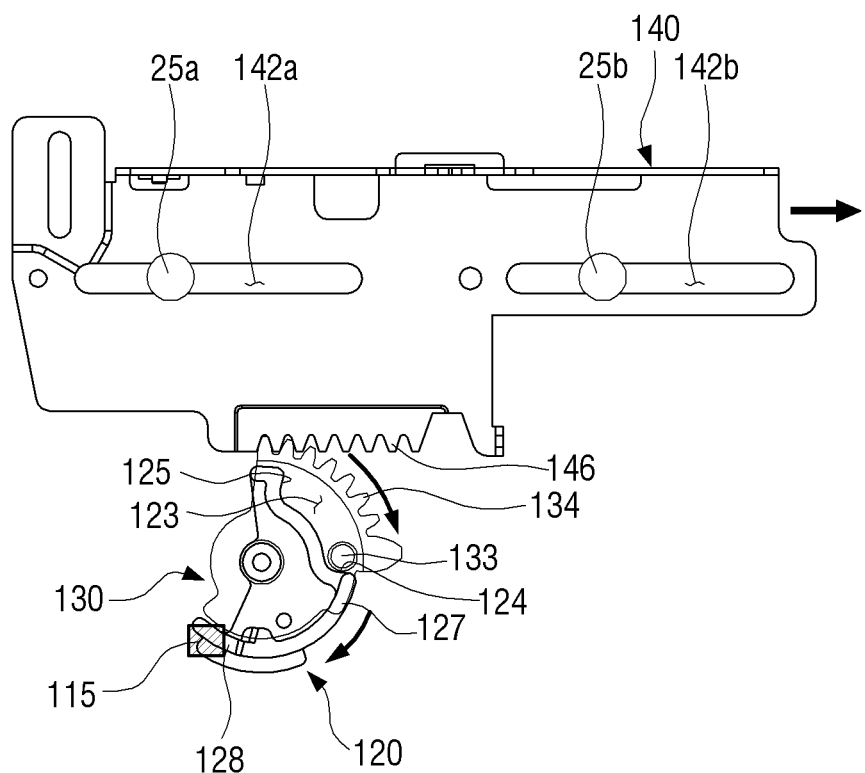

Referring to FIG. 9C illustrating the case where the ascending and descending protrusion 51 is placed in the position L3, the upper rotary member 120 is rotated by the pressing protrusion 133 of the lower rotary member 130 to a predetermined angle in the clockwise direction. At that time, the pressing projection 126 of the upper rotary member 120 upwardly presses the pivoting piece 115 of the roller support member 110 using the inclined surface 128 thereof. Accordingly, as the roller support member 110 pivots by a predetermined angle, the conveyance roller 60 being supported by the roller support member 110 is in the non-contact position with the disk D.

Figure 9D:
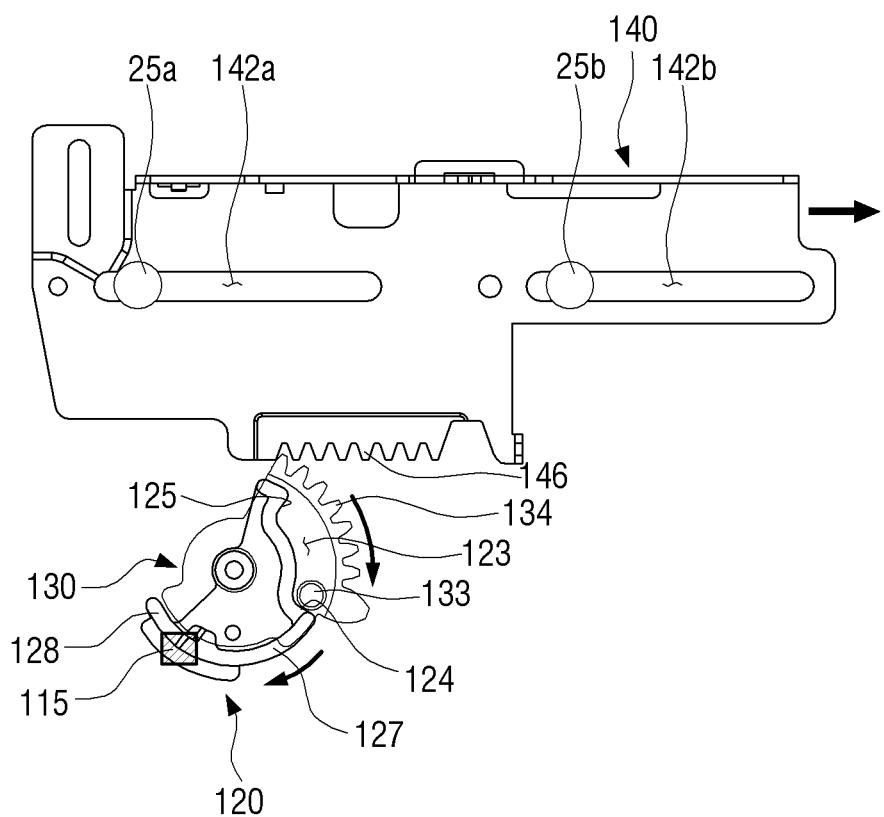

Referring to FIG. 9D illustrating the case where the ascending and descending protrusion 51 is placed in the position L4, the lower rotary member 130 and the upper rotary member 120 are further rotated in the clockwise direction. At that time, the pressing projection 126 of the upper rotary member 120 still upwardly presses the pivoting piece 115 of the roller support member 110 using the horizontal surface 127 thereof. Accordingly, the conveyance roller 60 is still in the non-contact position with the disk D.

As for the movement of the conveyance roller 60 when the disk D is loaded, the conveyance roller 60 in the contact position with the disk D converts into the non-contact position when the ascending and descending protrusion 51 is placed in the position L3. In other words, when the disk D is loaded, the conveyance roller 60 is in the contact position with the disk D in the section L1-L3 and is in the non-contact position in the section L3-L4. Since the chucking of the disk D is performed in the position L2, it can be known that the conveyance roller 60 moves to the non-contact position with the disk D after the chucking of the disk D has been completed.

Figure 10:
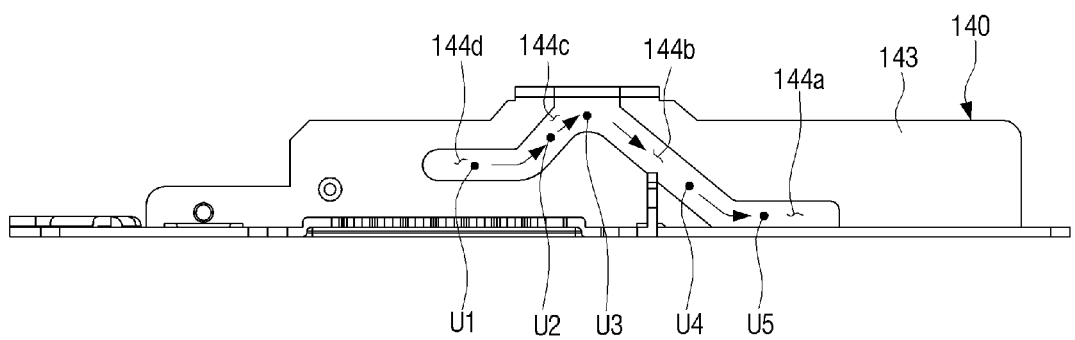
FIG. 10 is a side view of a sliding member to explain movement of an ascending and descending protrusion when a disk is unloaded according to an exemplary embodiment.

Referring to FIG. 10 and FIGS. 11A to 11E, an operation of the roller driving unit 100 (see FIG. 4) when the disk D is unloaded will be explained. FIG. 10 is a side view illustrating the sliding member 140 to explain the movement of the ascending and descending protrusion 51 when the disk D is unloaded, and FIGS. 11A to 11E are plane views sequentially illustrating an operation of the roller driving unit 100 when the disk D is unloaded.

As shown in FIG. 10, as the sliding member 140 moves to the left when the disk D is unloaded, the ascending and descending protrusion 51 of the traverse assembly 50 moves from an initial position U1 and reaches a position U5 through positions U2, U3, U4. The positions U1, U2, U3, and U5 of FIG. 10 correspond to the positions L4, L3, L2, and L1 of FIG. 8, respectively.

Figure 11A:
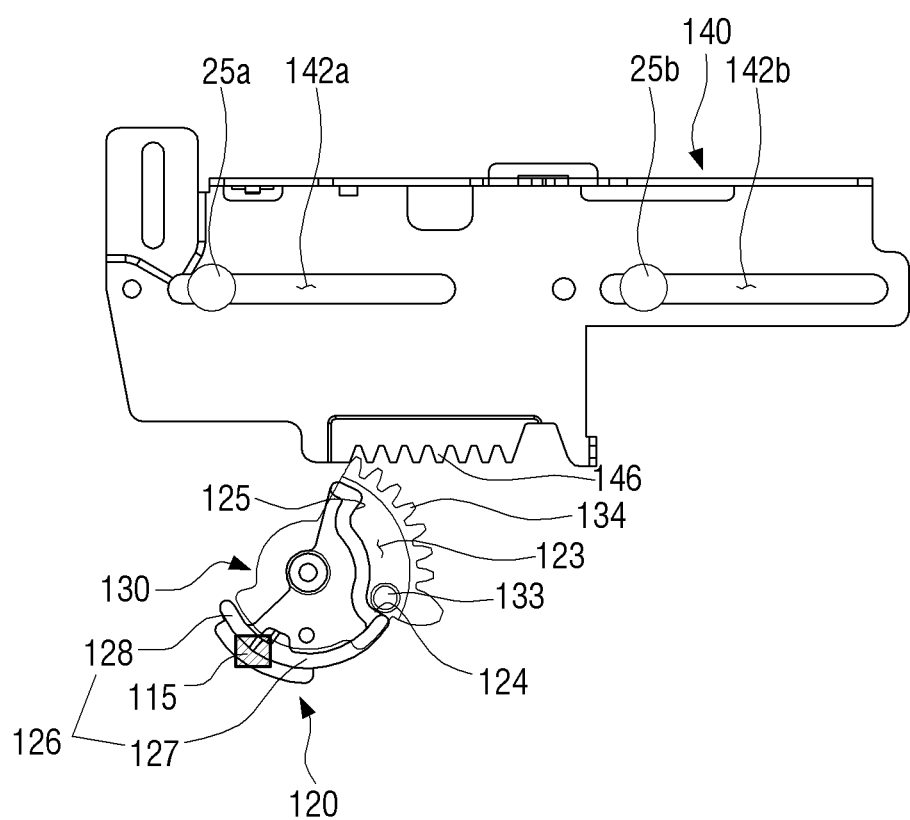
FIGS. 11A to 11E are plane views sequentially illustrating an operation of a roller driving unit when a disk is unloaded according to an exemplary embodiment.

Referring to FIG. 11A illustrating the case where the ascending and descending protrusion 51 is placed in the position U1, the pressing protrusion 133 of the lower rotary member 130 is adjacent to the first contact surface 124 of the upper rotary member 120. The pressing projection 126 of the upper rotary member 120 upwardly presses the pivoting piece 115 of the roller support member 110 using the horizontal surface 127 thereof. Accordingly, when the ascending and descending protrusion 51 is placed in the position U1, the conveyance roller 60 being supported by the roller support member 110 is in the non-contact position with the disk D.

Figure 11B:
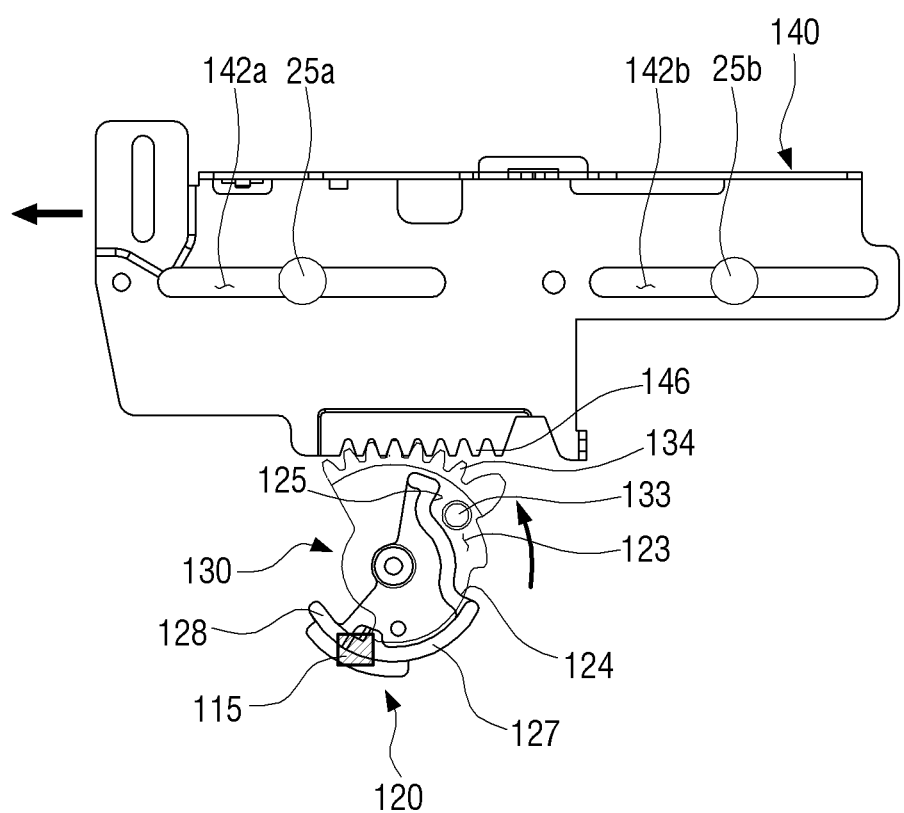

Referring to FIG. 11B illustrating the case where the ascending and descending protrusion 51 is placed in the position U2, the lower rotary member 130 is being rotated and the pressing protrusion 133 of the lower rotary member 130 does not press the second contact surface 125 of the upper rotary member 120. Accordingly, the upper rotary member 120 is in the idle status and thus the conveyance roller 60 being supported by the roller support member 110 is still in the non-contact position with the disk D.

Figure 11C:
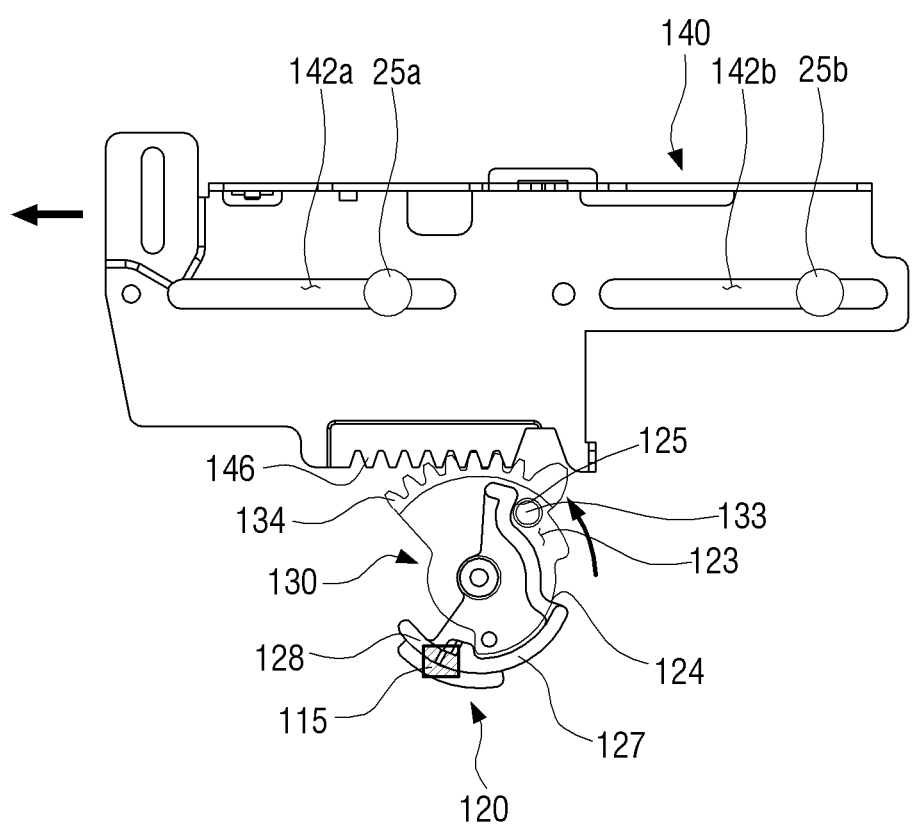

Referring to FIG. 11C illustrating the case where the ascending and descending protrusion 51 is placed in the position U3, the lower rotary member 130 is being rotated. Since the pressing protrusion 133 of the lower rotary member 130 approaches the second contact surface 125 of the upper rotary member 120 but does not press the second contact surface 125, the upper rotary member 120 still maintains the idle status. Accordingly, the conveyance roller 60 being supported by the roller support member 110 is still in the non-contact position with the disk D.

Figure 11D:
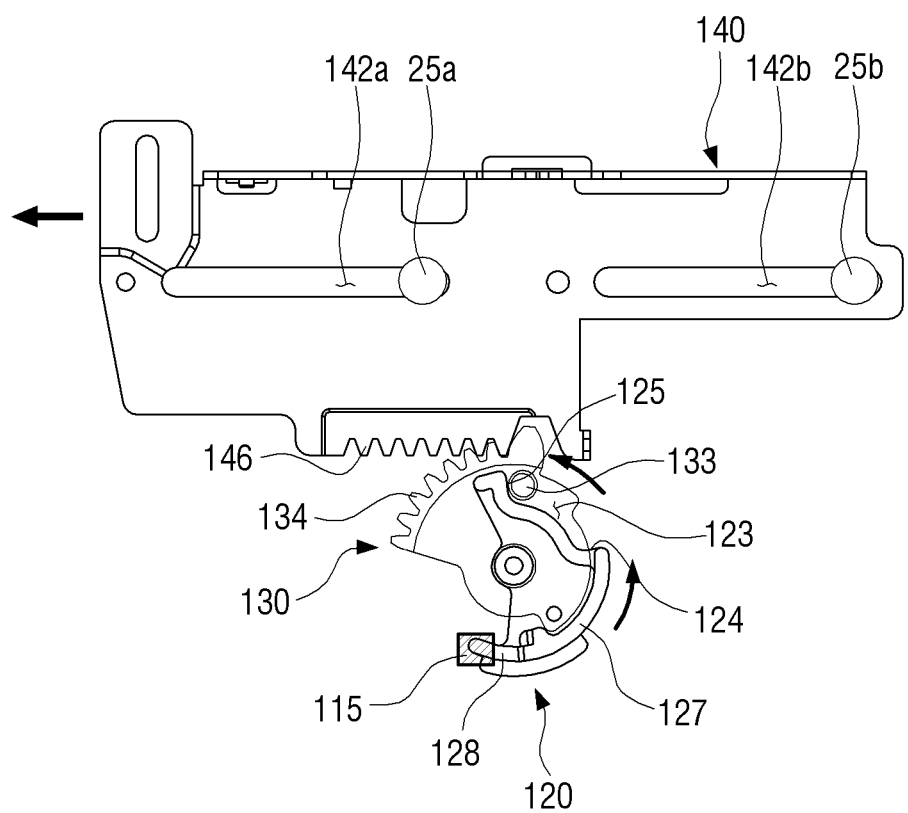

Referring to FIG. 11D illustrating the case where the ascending and descending protrusion 51 is placed in the position U4, the unchucking of the disk D is performed when the ascending and descending protrusion 51 is placed in the position U4 which is lower than the position U1 (the unchucking of the disk D is illustrated in FIG. 3B). At that time, the lower rotary member 130 is being rotated and the pressing protrusion 133 of the lower rotary member 130 presses the second contact surface 125 of the upper rotary member 120. Accordingly, the upper rotary member 120 is rotated in the same direction as the lower rotary member 130. Consequently, the pivoting piece 115 of the roller support member 110 is placed on the inclined surface 128 of the pressing projection 126 of the upper rotary member 120. In other words, the pressing projection 126 of the upper rotary member 120 still upwardly presses the pivoting piece 115 of the roller support member 110 using the inclined surface 128 thereof. Accordingly, the conveyance roller 60 being supported by the roller support member 110 is still in the non-contact position with the disk D at the position U4 where the unchucking of the disk D is completed.

Figure 11E:
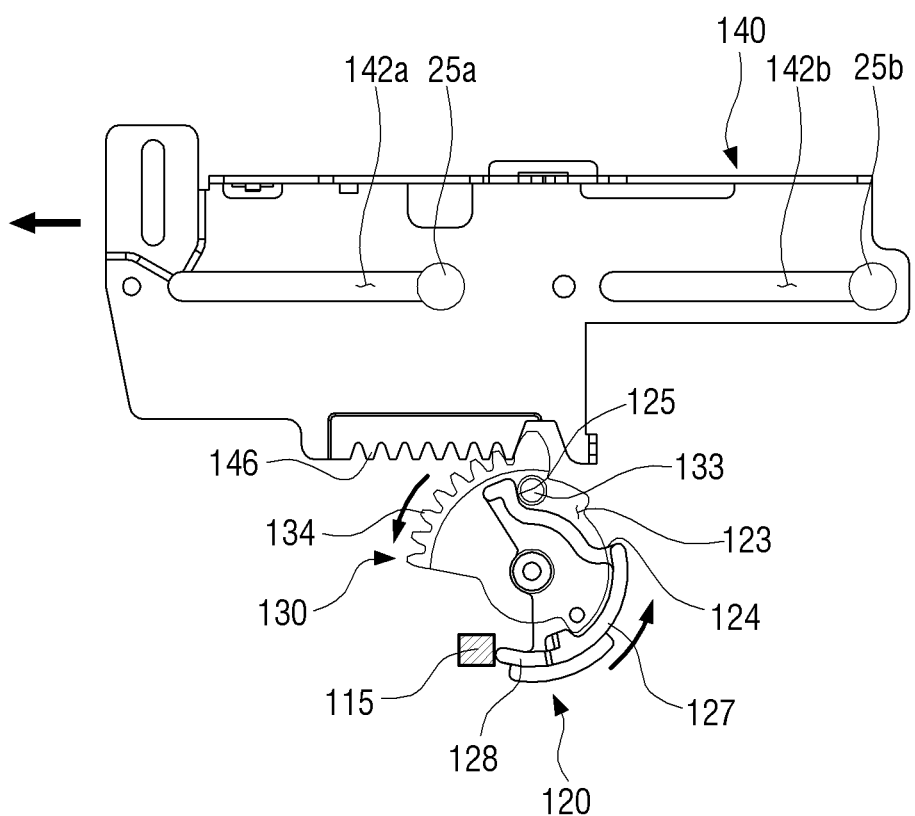

Referring to FIG. 11E illustrating the case where the ascending and descending protrusion 51 is placed in the position U5, the upper rotary member 120 is further rotated by the lower rotary member 130 and thus the pivoting piece 115 of the roller support member 110 leaves from the inclined surface 128 of the pressing projection 126 of the upper rotary member 120. In other words, the upward pressing of the pressing projection 126 of the upper rotary member 120 toward the pivoting piece 115 of the roller support member 110 is released. Accordingly, the conveyance roller 60 being supported by the roller support member 110 is in the contact position with the disk D.

As for the movement of the conveyance roller 60 when the disk D is unloaded, the conveyance roller 60 is in the non-contact position with the disk D in the section U1-U4 and is in the contact position after the position U4. Since the unchucking of the disk D is performed in the position U4, it can be known that the conveyance roller 60 moves to the contact position with the disk D after the unchucking of the disk D has been completed.

As described above, referring to FIGS. 8 and 10, when the disk D is loaded, the conveyance roller 60 is in the contact position with the disk D in the section L1-L3 and converts into the non-contact position after the position L3. On the other hand, when the disk D is unloaded, the conveyance roller 60 is in the non-contact position with the disk D in the section U1-U4 and converts into the contact position with the disk D after the position U4. From this, it can be understood that, in the section U2 (corresponding to L3)-U4, the conveyance roller 60 is in the contact position with the disk D when the disk D is loaded, while the conveyance roller 60 is in the non-contact position with the disk D when the disk D is unloaded.

As described above, the reason why the conveyance roller 60 is in the different positions in the section U2-U4 when the disk D is loaded and when the disk D is unloaded is that the upper rotary member 120 has the buffer recess 124 lager than the pressing protrusion 133 and thus only the lower rotary member 130 is rotated and the upper rotary member 120 is not rotated during a predetermined time when the disk D is loaded or unloaded. If the buffer recess 123 is not provided on the upper rotary member 120, the upper rotary member 120 and the lower rotary member 140 would be always rotated together and thus the conveyance roller 60 is in the same position in the section U2-U4.

Briefly, since the buffer recess 123 is formed on the upper rotary member 120, the conveyance roller 60 is controlled to be in contact with the disk D in the section U2-U4 when the disk D is loaded, but is controlled not to be in contact with the disk D in the section U2-U4 when the disk D is unloaded. Since the conveyance roller 60 is controlled as described above, the contact between the conveyance roller 60 and the disk D is released after the chucking of the disk D has been completed, and the contact is reestablished after the unchucking of the disk D has been completed.

As described above, if the conveyance roller 60 does not support the disk D until the chucking of the disk D is completed, the disk D may deviate from the chucking position and the chucking of the disk D may not be normally performed. Also, if the conveyance roller 60 is brought into contact with the disk D and conveys the disk D before the unchucking of the disk D is completed, the disk may be caught in the chucking member 42 of the turntable 41 (see FIG. 2).

However, in the present exemplary embodiment, since the buffer recess 123 is formed on the upper rotary member 120, the contact between the conveyance roller 60 and the disk D is released after the chucking of the disk D has been completed, and the contact is reestablished after the unchucking of the disk D has been completed. Accordingly, the malfunction in the chucking of the disk D and the problem that the disk D may be caught in the turntable 41 can be prevented.

Figure 12:
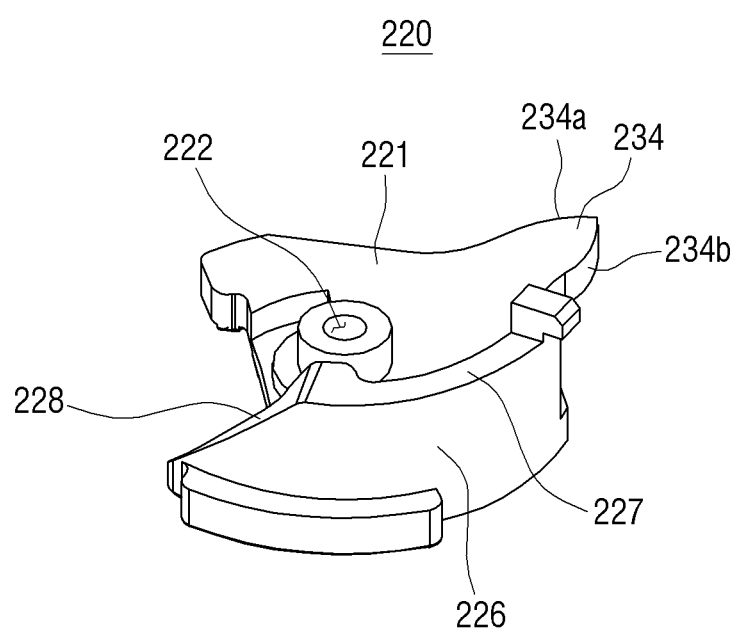
FIG. 12 is a perspective view illustrating a cam member which is provided in a roller driving unit according to a second exemplary embodiment.
Figure 13:
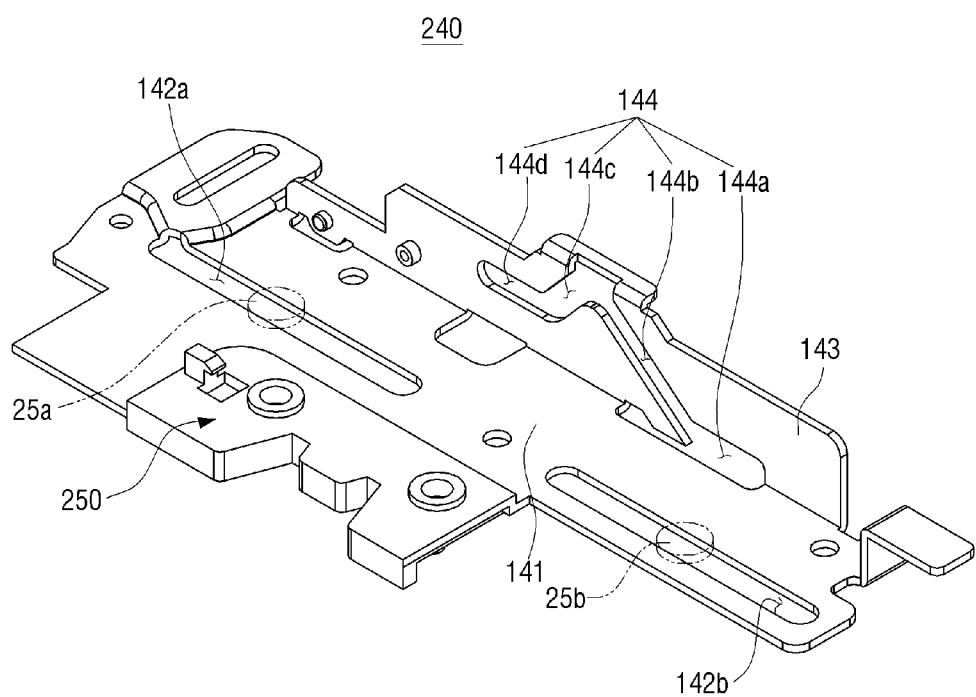
FIG. 13 is a perspective view illustrating a sling member which is provided in a roller driving unit according to a second exemplary embodiment.
Figure 14:
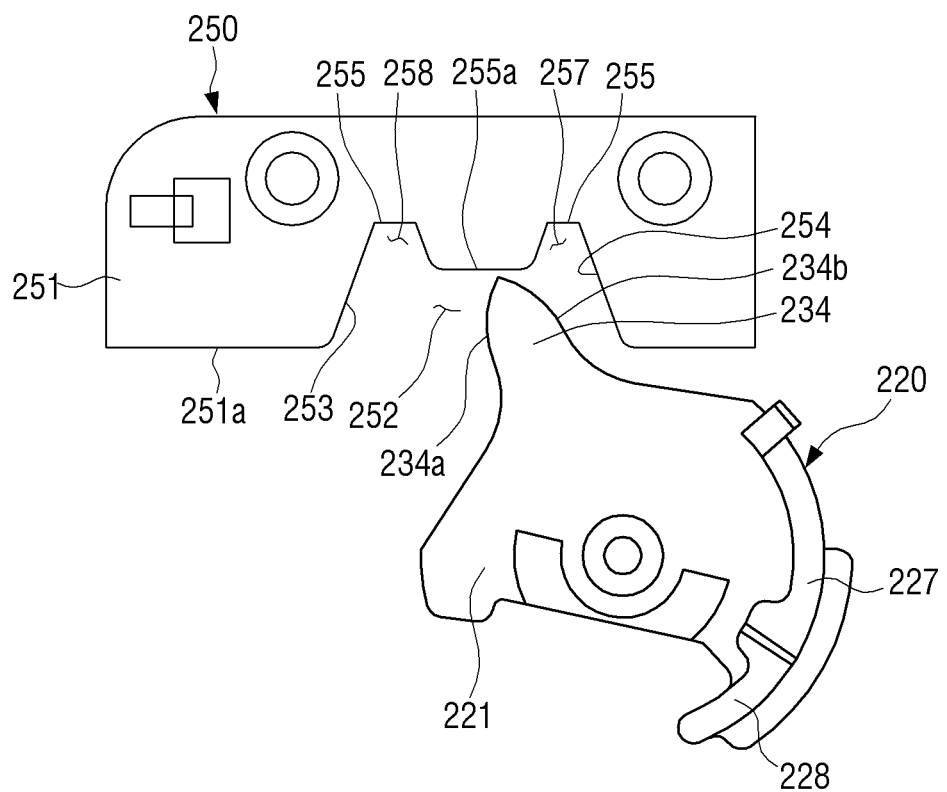
FIG. 14 is a plane view illustrating a cam driving part which is provided in the sliding member of FIG. 13 along with the cam member.

Referring to FIGS. 12 to 14, a roller driving unit according to a second exemplary embodiment will be explained as an alternative to the roller driving unit 100 shown in FIG. 3. FIG. 12 is a perspective view illustrating a cam member which is provided in a roller driving unit according to a second exemplary embodiment, FIG. 13 is a perspective view illustrating a sliding member which is provided in a roller driving unit according to a second exemplary embodiment, and FIG. 14 is a plane view illustrating a cam driving part which is provided in the sliding member of FIG. 13 along with the cam member.

Referring to FIGS. 12 to 14, a roller driving unit according to a second exemplary embodiment includes a roller support member 110 (identical to the roller support member shown in FIG. 5), a cam member 220, and a sliding member 240.

The roller support member 110 is identical to the roller support member shown in FIG. 5 and thus a detailed description thereof is omitted.

As shown in FIG. 12, the cam member 220 includes a rotary body 221, a pressing projection 226, and a cam protrusion 234. The cam member 220 may be substantially a combination form of the upper rotary member 120 and the lower rotary member 130 shown in FIG. 6.

The rotary body 221 is rotatable in a clockwise direction or a counter clockwise direction on a rotary shaft (not shown) which is secured to a shaft insertion hole 222.

The pressing projection 226 extends from an outer circumference of the rotary body 221 in a direction perpendicular to the rotary body 221. The pressing projection 226 has a horizontal surface 227 and an inclined surface 228 which is inclined with respect to the horizontal surface 227. For reference, the shape and the function of the pressing projection 226 correspond to those of the pressing projection 126 of the upper rotary member 120 of FIG. 6.

Therefore, the pivoting piece 115 (see FIG. 5) of the roller support member 110 can be lifted upwardly by the pressing projection 226 of the cam member 220. More specifically, referring to FIG. 5, if the pivoting piece 115 of the roller support member 110 is upwardly lifted, the roller support member 110 pivots on the rotary shafts 22 and 23 thereof in a direction (in a clockwise direction in FIG. 5), so that the conveyance roller 60 being supported by the roller support member 110 moves down. If the pivoting piece 115 moves downwardly, the roller support member 100 pivots on the rotary shafts 22 and 23 in an opposite direction (in a counter clockwise direction in FIG. 5) so that the conveyance roller 60 is upwardly lifted.

The cam protrusion 234 outwardly protrudes from the outer circumference of the rotary body 221—horizontally with respect to the rotary body 221. The cam protrusion 234 is disposed approximately on an opposite side of the inclined surface 228 of the pressing projection 226. The cam protrusion 234 is pressed by the sliding member 240, which will be described later, thereby receiving rotational force from the sliding member 240. The cam protrusion 234 has two opposite corners, that is, a first side end 234a and a second side end 234b. The first side end 234a and the second side end 234b will be explained below in detail.

As shown in FIG. 13, the sliding member 240 includes a sliding body 141 and an ascending and descending guide plate 143.

The sliding member 240 is identical to the sliding member 140 shown in FIG. 7 in view of the ascending and descending guide plate 143, but, is different from the sliding member 140 in view of the sliding body 141. Specifically, the sliding member 140 of FIG. 7 has the spur gear 146 formed on one lengthwise end of the sliding body 141, whereas the sliding member 240 of FIG. 13 has a cam driving part 250 instead of the spur gear 146. Therefore, the sliding member 240 of FIG. 13 uses the same reference numerals as those of the sliding member 140 of FIG. 17 except for the cam driving part 250.

As shown in FIG. 13, the sliding body 141 includes the ascending and descending guide plate 143 formed on one lengthwise end of the sliding body 141 and includes the cam driving part 250 formed on the other lengthwise end of the sliding body 141. The cam driving part 250 is removably screwed to the sliding body 141. Alternatively, the cam driving part 250 may be integrally formed with the sliding body 141.

As shown in FIG. 14, the cam driving part 250 includes a cam driving body 251 engaged with the sliding body 141, and a buffer recess 252 is concavely formed on one edge 251a of the cam driving body 251. It should be noted that the buffer recess 252 of the cam driving part 250 performs the same function as that of the buffer recess 123 formed on the upper rotary member 120 of the first exemplary embodiment.

The buffer recess 252 has a substantially trapezoidal shape and includes a first contact end 253 and a second contact end 254 which face each other, and an inner end 255 which is disposed between the first and the second contact ends 253 an 254.

The first contact end 253 is brought into contact with the first side end 234a of the cam protrusion 234, when a disk D is loaded, and the second contact end 254 is brought into contact with the second side end 234b of the cam protrusion 234, when the disk D is unloaded. As shown in FIG. 14, a gap between the first contact end 253 and the second contact end 254 is larger than a width between the first side end 234a and the second side end 234b of the cam protrusion 234.

A recess forming protrusion 255a is formed on the inner end 255 of the buffer recess 252. Therefore, a cam protrusion restraining recess 257 is formed between the recess forming protrusion 255a and the second contact end 254 in the buffer recess 252, and a cam protrusion escaping recess 258 is formed between the recess forming protrusion 255a and the first contact end 253. When the disk D is unloaded, the cam protrusion 234 is inserted into the cam protrusion restraining recess 257 so that the cam protrusion restraining recess 257 can prevent a collision between the disk D and the cover frame 30 (see FIG. 3), which may occur due to an undesirable high speed rotation of the cam member 220, and consequential noise. The cam protrusion escaping recess 258 provides a escaping space for the cam protrusion 234 so that an end of the cam protrusion 234 is not caught in the buffer recess 252 when the disk D is loaded.

Hereinafter, operations of the roller driving unit according to the second exemplary embodiment, when the disk D is loaded and when the disk D is unloaded, will be explained.

Referring to FIGS. 15A to 15D, the operation when the disk D is loaded will be explained first. It should be understood that FIGS. 15A to 15D correspond to FIGS. 9A to 9D described above.

As described in the first exemplary embodiment with reference to FIG. 8, as the sliding member 240 moves to the right when the disk D is loaded, the ascending and descending protrusion 51 (see FIG. 4) of the traverse assembly 50 reaches a position L4 through positions L1, L2, and L3. L1 indicates an initial position.

Figure 15A:
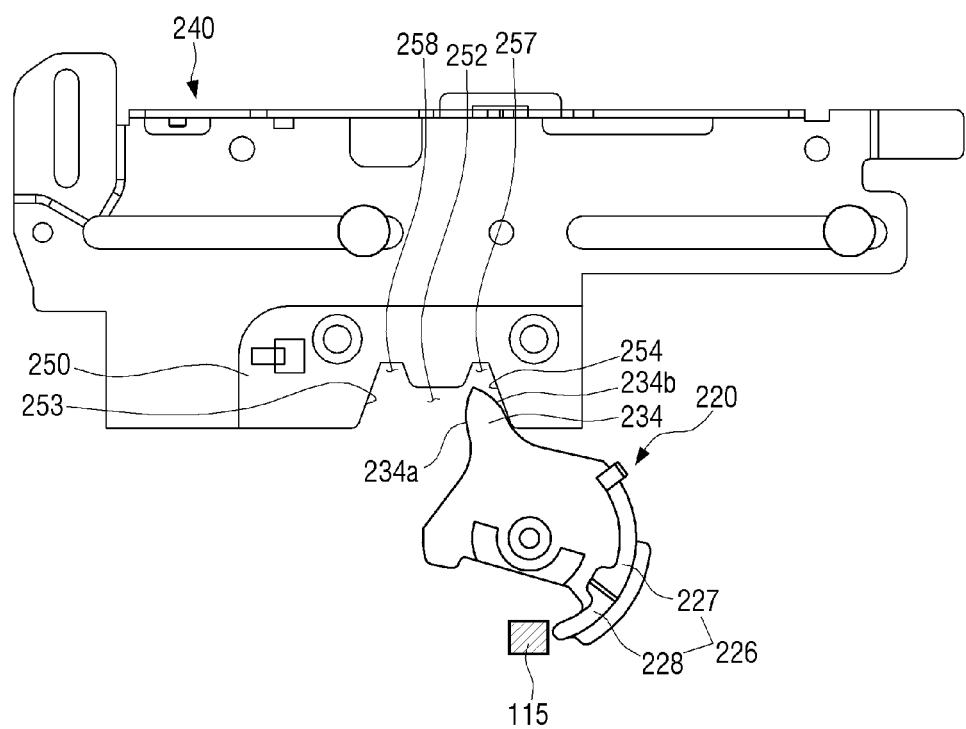
FIGS. 15A to 15D are plane views sequentially illustrating an operation of a roller driving unit when a disk is loaded according to a second exemplary embodiment.

Referring to FIG. 15A illustrating the case where the ascending and descending protrusion 51 is placed in the position L1, the ascending and descending protrusion 51 is placed in the first guide recess 144a (see FIG. 8) of the sliding member 240. The second side end 234b of the cam protrusion 234 is adjacent to the second contact end 254 of the buffer recess 252, and the pivoting piece 115 (see FIG. 5) of the roller support member 110 is not lifted by the pressing projection 120 of the cam member 220. Accordingly, when the ascending and descending protrusion 51 is placed in the position L (initial position), the conveyance roller 60 (see FIG. 5) being supported by the roller support member 110 is placed in a 'contact position' with the disk D.

Figure 15B:
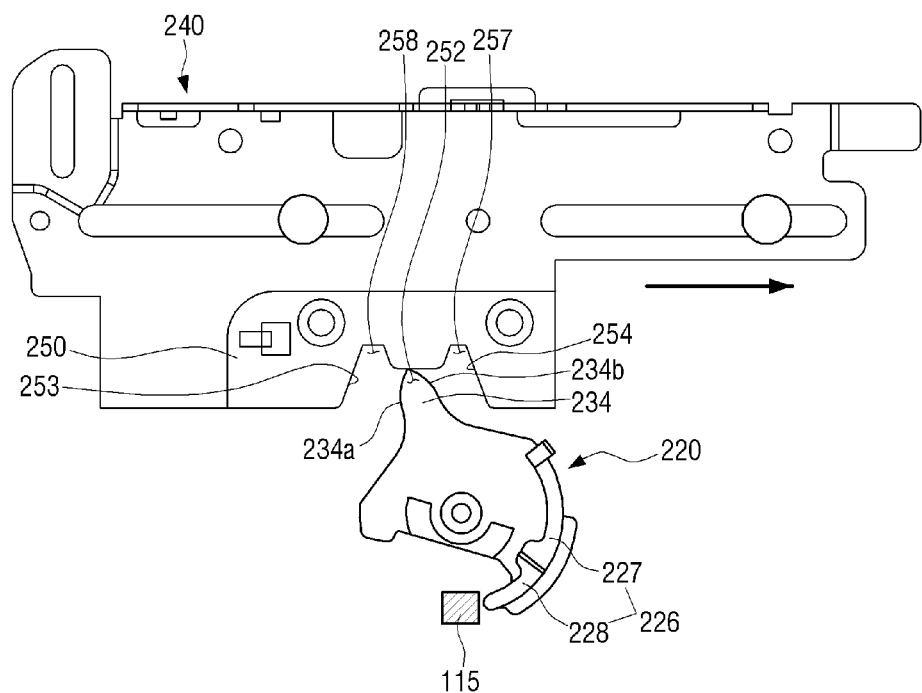

Referring to FIG. 15B illustrating the case where the ascending and descending protrusion 51 is placed in the position L2, chucking of the disk D is completed (see FIG. 2B). Since the cam protrusion 234 does not contact the first contact end 253 of the buffer recess 252, the cam member 220 is still in an idle status. Accordingly, the conveyance roller 160 is still in the 'contact position' with the disk D at a time when the chucking of the disk D has been completed.

Figure 15C:
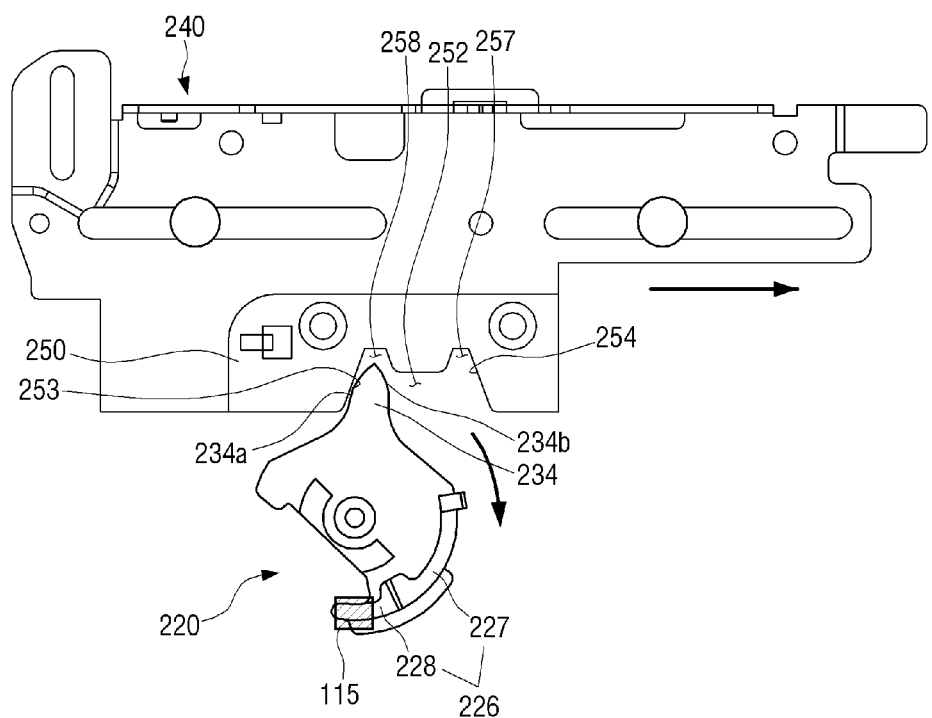

Referring to FIG. 15C illustrating the case where the ascending and descending protrusion 51 is placed in the position L3, the first contact end 253 of the sliding member 240 moving to the right presses the first side end 234a of the cam protrusion 234, so that the cam member 220 is rotated in a clockwise direction. Since the pivoting piece 115 of the roller support member 110 is lifted to the inclined surface 228 of the pressing projection 226 of the cam member 220, the conveyance roller 60 being supported by the roller support member 110 descends and is placed in a 'non-contact position' with the disk D. On the other hand, as shown in FIG. 15C, when the first contact end 253 of the sliding member 240 presses the first side end 234a of the cam protrusion 234, the end of the cam protrusion 234 is partially inserted into the cam protrusion escaping recess 258 in the buffer recess 252.

Figure 15D:
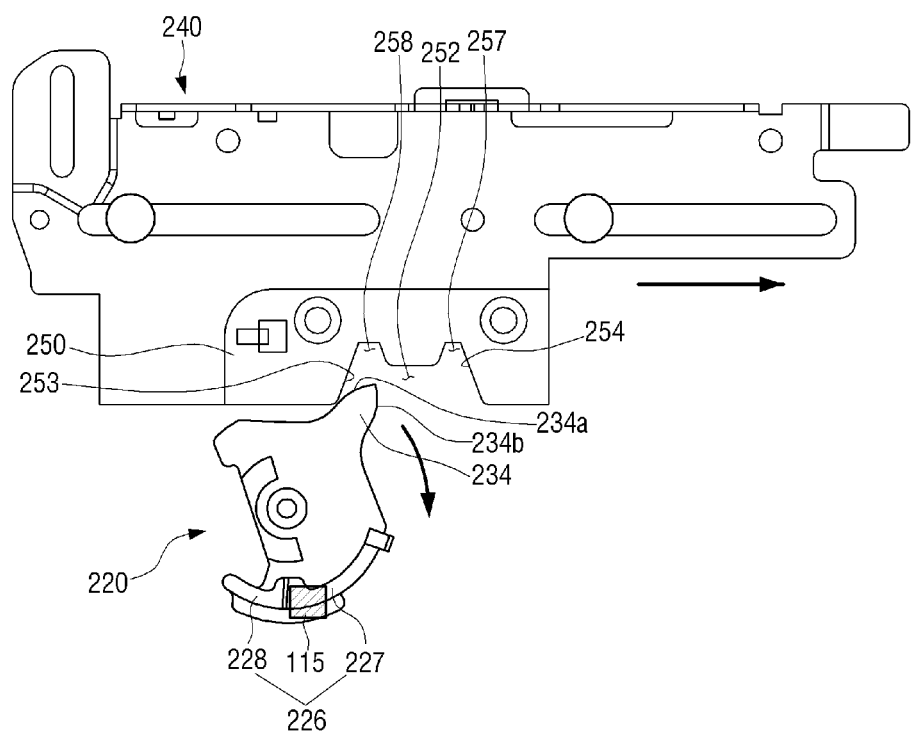

Referring to FIG. 15D illustrating the case where the ascending and descending protrusion 51 is placed in the position L4, it can be seen that the cam member 220 is further rotated in the clockwise direction. Accordingly, the pivoting piece 115 of the roller support member 110 is placed on the horizontal surface 227 of the pressing projection 226 of the cam member 220. At this time, since the pivoting piece 115 of the roller support member 110 is still lifted upwardly by the pressing projection 226, the conveyance roller 60 being supported by the roller support member 110 is still in the 'non-contact position' with the disk D.

As for the movement of the conveyance roller 60 described above with reference to FIGS. 15A to 15D, the conveyance roller 60 is in the contact position with the disk D until the ascending and descending protrusion 51 is placed in the position 2, in which the disk D is chucked, and converts into the non-contact position when the ascending and descending protrusion 51 is placed substantially in the position L3 between the positions L2 and L4. To this end, it can be seen that, when the disk D is loaded, the conveyance roller 60 moves to the non-contact position with the disk D after the chucking of the disk D has been completed.

Next, referring to FIGS. 16A to 16E, an operation of the roller driving unit when the disk D is unloaded will be explained. It should be understood that FIGS. 16A to 16E correspond to FIGS. 11A to 11E described above.

As described above in the first exemplary embodiment with reference to FIG. 10, as the sliding member 240 moves to the left when the disk D is unloaded, the ascending and descending protrusion 51 of the traverse assembly 50 moves from an initial position U1 and reaches a position U5 through positions U2, U3, U4. The positions U1, U2, U3, and U5 correspond to the positions L4, L3, L2, and L1 of FIG. 8, respectively.

Figure 16A:
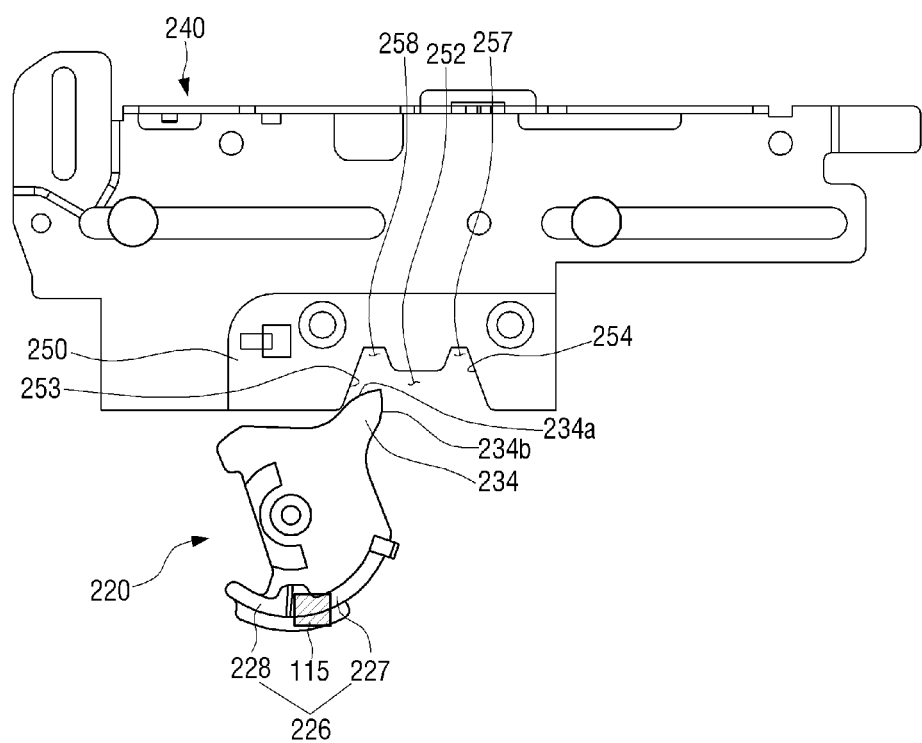
FIGS. 16A to 16E are plane views sequentially illustrating an operation of a roller driving unit when a disk is unloaded according to a second exemplary embodiment.

Referring to FIG. 16A illustrating the case where the ascending and descending protrusion 51 is placed in the position U1, the cam protrusion 234 of the cam member 220 is placed such that the first side end 234a is adjacent to the first contact end 253 of the buffer recess 252. Since the pivoting piece 115 (see FIG. 5) of the roller support member 110 is lifted on the horizontal surface 227 of the pressing projection 226, the conveyance roller 60 (see FIG. 5) is in the 'non-contact position' with the disk D.

Figure 16B:
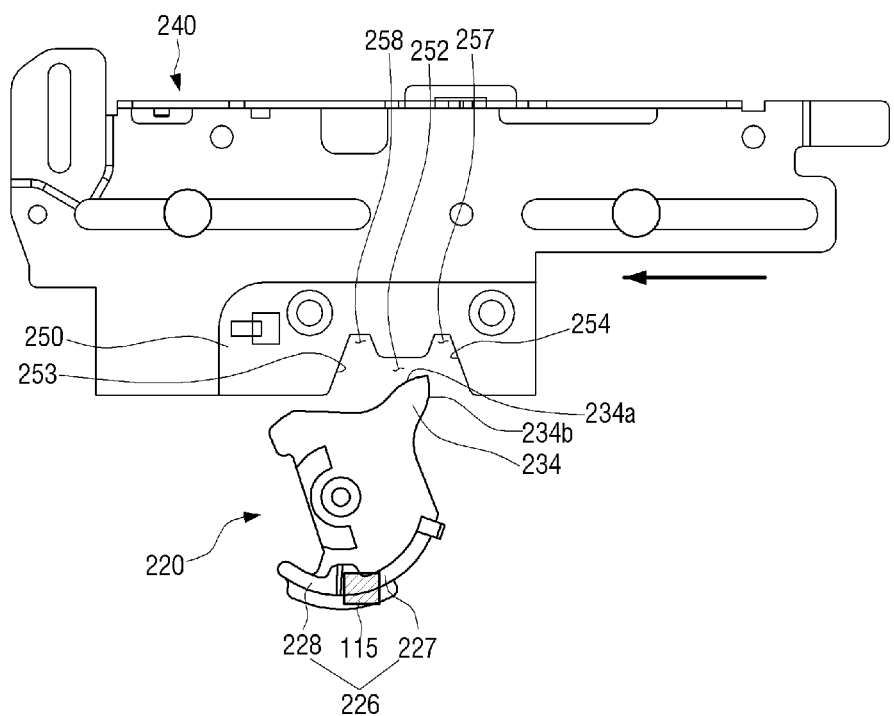

Referring to FIG. 16B illustrating the case where the ascending and descending protrusion 51 is placed in the position U2, the sliding member 240 slides to the left, but, the cam member 220 is not pressed by the sliding member 240 and thus is not rotated. Therefore, the conveyance roller 60 is still in the 'non-contact position' with the disk D.

Figure 16C:
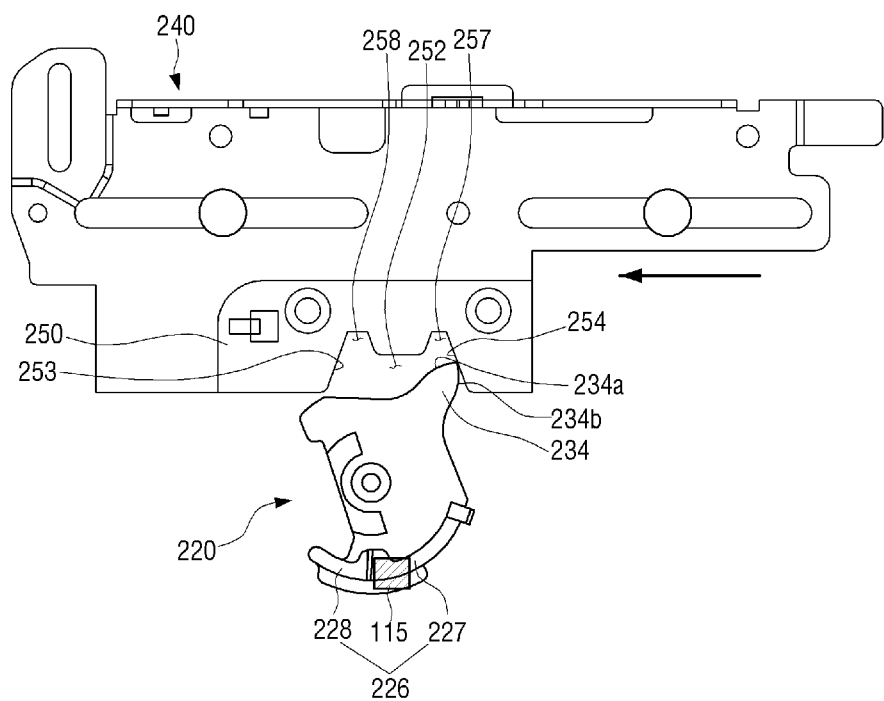

Referring to FIG. 16C illustrating the case where the ascending and descending protrusion 51 is placed in the position U3, the second contact end 254 of the sliding member 240 is in contact with the second side end 234b of the cam protrusion 234, but does not press the second side end 234b. Accordingly, the cam member 220 does not yet start to rotate and the conveyance roller 60 is still in the 'non-contact position' with the disk D.

Figure 16D:
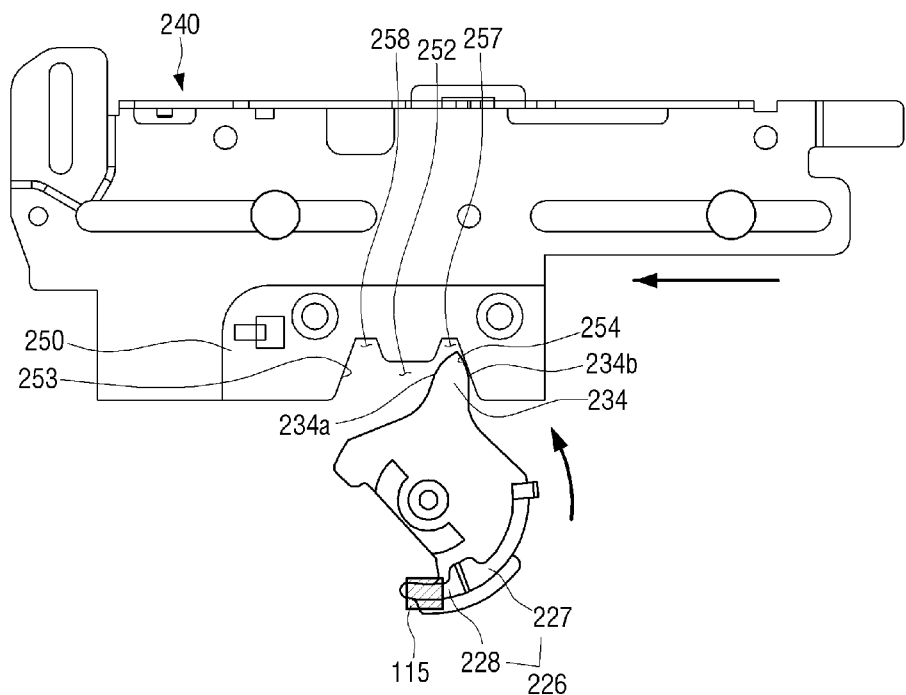

Referring to FIG. 16D illustrating the case where the ascending and descending protrusion 51 is placed in the position U4, unchucking of the disk D is performed when the ascending and descending protrusion 51 is placed in the position U4 (see FIG. 3B). At this time, the second contact end 254 of the sliding member 240 presses the cam protrusion 234 so that the cam member 220 is rotated in a counter clockwise direction. At this time, the pivoting piece 115 of the roller support member 110 slightly descends from the horizontal surface 227 of the pressing projection 226 to the inclined surface 228, but the conveyance roller 60 is still lifted on the pressing projection 226 and thus is still in the 'non-contact position' with the disk D.

As shown in FIG. 16D, as the cam member 220 is rotated by the sliding member 240 in the counter clockwise direction when the disk D is unloaded, the end of the cam protrusion 234 may be inserted into the cam protrusion restraining recess 257 in the buffer recess 252. That is, when the cam member 220 is rotated in the counter clockwise direction, the end of the cam protrusion 234 is restrained by the cam protrusion restraining recess 257 so that a rotational velocity of the cam member 220 can be controlled to be identical to a sliding velocity of the sliding member 240.

If the cam protrusion restraining recess 257 is not provided, the cam member 220 may be rotated in the counter clockwise direction with an excess rotation velocity at a time when the sliding member 240 presses the cam member 220. In this case, the conveyance roller 60 is lifted fast and thus hits the unchucked disk D upwardly. As a result, the disk D collides with the cover frame 30 (see FIG. 3) disposed above the disk D and thus may cause noise.

However, since the roller driving unit according to the present exemplary embodiment includes the cam protrusion restraining recess 257 which is disposed on the sliding member 240 to restrain the cam protrusion 234 and thus to prevent rapid rotation of the cam member 220 when the disk D is unloaded, the collision between the unchucked disk D and the cover frame 30 and the consequential noise can be prevented.

Figure 16E:
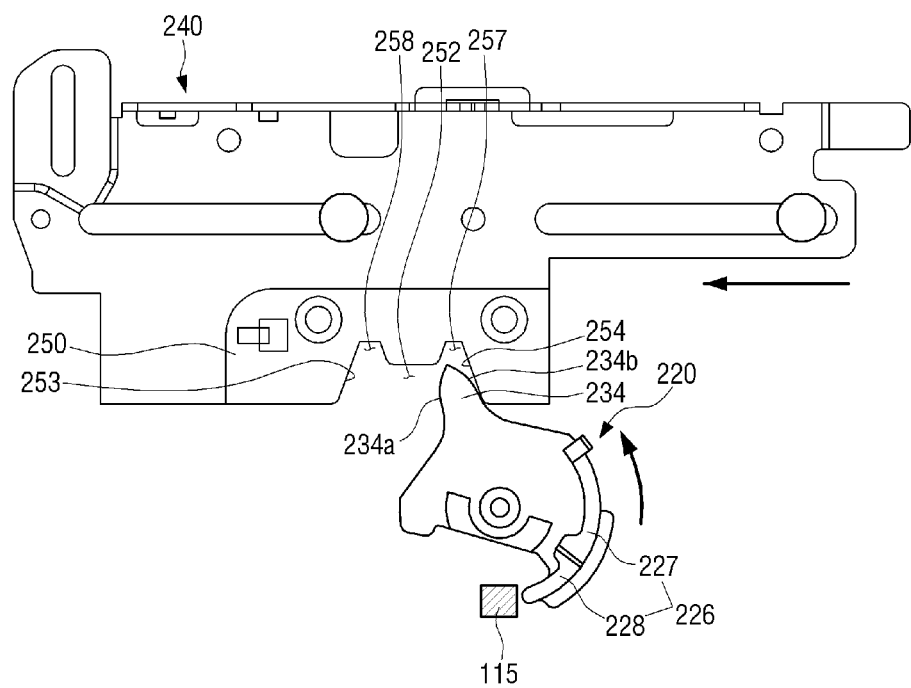

Referring to FIG. 16E illustrating the case where the ascending and descending protrusion 51 is placed in the position U5, the cam member 220 is further rotated in the counter clockwise direction and the pivoting piece 115 of the roller support member 110 is completely released from the pressing projection 226. Accordingly, the conveyance roller 60 being supported by the roller support member 110 is in the 'contact position' with the disk D.

As for the movement of the conveyance roller 60 described above with reference to FIGS. 16A to 16E, the conveyance roller 60 is in the non-contact position with the disk D until the ascending and descending protrusion 51 is placed in the position U4, in which the disk D is unchucked, and enters the contact position with the disk D after the position U4. Accordingly, it can be known that, when the disk D is unloaded, the conveyance roller 60 moves to the contact position with the disk D after the unchucking of the disk D has been completed.

As in the first exemplary embodiment, according to the second exemplary embodiment described above, when the disk D is loaded, the conveyance roller 60 converts into the non-contact position with the disk D after the chucking of the disk D has been completed, and, when the disk D is unloaded, the conveyance roller 60 converts into the contact position with the disk D after the unchucking of the disk D has been completed. Accordingly, due to the presence of the roller driving unit according to the second exemplary embodiment, a chucking error, which may occur due to deviation of the disk D from a chucking position, can be prevented, and a problem that the disk D may be caught in the chucking member 42 of the turntable 41 by the contact of the conveyance roller 60 with the disk D before the unchucking of the disk D can be prevented.

Additionally, since the sliding member 240 includes the cam protrusion restraining member 257 to restrain the cam protrusion 234 and thus to prevent the rapid rotation of the cam member 220 when the disk D is unloaded, the collision between the unchucked disk D and the cover frame 30 and the sequential noise can be prevented.

The foregoing exemplary embodiments and advantages are merely exemplary and are not to be construed as limiting the present inventive concept. The exemplary embodiments can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A slot-in type disk drive apparatus comprising:
a frame which comprises a slot to insert a disk therethrough;
a spindle motor assembly which comprises a turntable and a spindle motor to rotate the turntable, the turntable comprising a disk seating part and a chucking member;
a traverse assembly which mounts the spindle motor thereon and is movable in a direction perpendicular to an inserting direction of the disk;
a conveyance roller which is movable in an axial direction of the disk between a contact position and a non-contact position with the disk and conveys the disk using a friction force; and
a roller driving unit which, when the disk is unloaded, moves the conveyance roller from the non-contact position to the contact position after an unchucking operation of the disk is completed,
wherein the roller driving unit comprises:
a roller support member which is pivotably disposed on the frame and supports the conveyance roller;
at least one rotary member which is rotatable in at least one of a clockwise direction and a counter clockwise direction and rotates the roller support member, and
a sliding member which reciprocates linearly and rotates the at least one rotary member, thereby operating the traverse assembly.

2. The slot-in type disk drive apparatus as claimed in claim 1, wherein, when the disk is loaded, the roller driving unit moves the conveyance roller from the contact position to the non-contact position after a chucking operation of the disk is completed.

3. The slot-in type disk drive apparatus as claimed in claim 2, wherein the roller driving unit comprises:
a roller support member which is pivotably disposed on the frame and supports the conveyance roller;
an upper rotary member which is rotated in at least one of a clockwise and a counter clockwise direction and rotates the roller support member;
a lower rotary member which is disposed under the upper rotary member and rotates the upper rotary member; and
a sliding member which reciprocates linearly and rotates the lower rotary member.

4. The slot-in type disk drive apparatus as claimed in claim 3, wherein the upper rotary member comprises:
a rotary body; and
a pressing projection which protrudes from the rotary body and rotates the roller support member,
wherein the pressing projection comprises:
a horizontal surface; and
an inclined surface which is connected to the horizontal surface and is inclined with respect to the horizontal surface, and
wherein a buffer recess curving inwardly is on the rotary body of the upper rotary member.

5. The slot-in type disk drive apparatus as claimed in claim 3, wherein the sliding member comprises:
a sliding body which reciprocates linearly;
an ascending and descending guide plate which is disposed on a side of the sliding body and guides an ascending movement and a descending movement of the traverse assembly; and
a spur gear which is disposed on another side of the sliding body and rotates the lower rotary member,
wherein an ascending and descending protrusion is disposed on an end of the traverse assembly and an ascending and descending guide recess is on the ascending and descending guide plate to guide a movement of the ascending and descending protrusion.

6. The slot-in type disk drive apparatus as claimed in claim 5, wherein the lower rotary member comprises:
a rotary body; and
a pressing protrusion which protrudes from the rotary body and rotates the upper rotary member,
wherein the pressing protrusion of the lower rotary member is placed in the buffer recess of the upper rotary member, and
wherein a width of the buffer recess is larger than a width of the pressing protrusion.

7. The slot-in type disk drive apparatus as claimed in claim 3, wherein the roller support member comprises:
a pivot body which is pivotable;
a pair of roller support parts which are disposed on opposite ends of the pivot body; and
a pivoting piece which is disposed on a side of the pivot body and is pressed by the upper rotary member.

8. The slot-in type disk drive apparatus as claimed in claim 7, wherein each of the pair of roller support parts comprises:

a roller receiving recess which receives an end of the conveyance roller; and a shaft insertion hole through which a rotary shaft provided on the frame is inserted.

9. The slot-in type disk drive apparatus as claimed in claim 2, wherein, when the disk is loaded, the traverse assembly ascends from a first position which is lowest to a second position which is highest and where the disk is chucked onto the chucking member, and then descends to a third position which is a disk play position between the first position and the second position.

10. The slot-in type disk drive apparatus as claimed in claim 9, wherein, when the disk is unloaded, the traverse assembly ascends from the third position to the second position and then descends to the first position.

11. The slot-in type disk drive apparatus as claimed in claim 10, wherein, when the traverse assembly is placed in a fourth position between the second position and the third position during loading of the disk, a chucking operation of the disk is completed.

12. The slot-in type disk drive apparatus as claimed in claim 11, wherein, when the traverse assembly is placed in a fifth position between the second position and the first position during unloading of the disk, an unchucking operation of the disk is completed.

13. The slot-in type disk drive apparatus as claimed in claim 2, wherein the at least one rotary member is a cam member which is rotated in a clockwise direction or a counter clockwise direction and pivotably drives the roller support member.

14. The slot-in type disk drive apparatus as claimed in claim 13, wherein the cam member comprises:

a rotary body;

a pressing projection which protrudes upwardly from the rotary body and pivotably drives the roller support member; and a cam protrusion which protrudes from the rotary body in parallel and receives rotational force from the sliding member.

15. The slot-in type disk drive apparatus as claimed in claim 14, wherein the pressing projection comprises:

a horizontal surface; and an inclined surface which is connected to the horizontal surface and is inclined with respect to the horizontal surface.

16. The slot-in type disk drive apparatus as claimed in claim 14, wherein the sliding member comprises:

a sliding body which reciprocates linearly;

an ascending and descending guide plate which is disposed on a side of the sliding body and guides an ascending movement and a descending movement of the traverse assembly; and a cam driving part which is disposed on the other side of the sliding body and rotates the cam member.

17. The slot-in type disk drive apparatus as claimed in claim 16, wherein the cam driving part comprises a cam driving body which is connected to the sliding body and reciprocates with the sliding body, wherein a buffer recess is provided on a corner of the cam driving body and receives the cam protrusion, and a width of the buffer recess is larger than a width of the cam protrusion.

18. The slot-in type disk drive apparatus as claimed in claim 17, wherein the buffer recess comprises:

a first contact end which is brought into contact with a first side end of the cam protrusion when the disk is loaded;

a second contact end which is brought into contact with a second side end of the cam protrusion when the disk is unloaded; and an inner end which is disposed between the first contact end and the second contact end and comprises a recess forming protrusion.

19. The slot-in type disk drive apparatus as claimed in claim 18, wherein the buffer recess further comprises a cam protrusion restraining recess which is disposed between the second contact end and the recess forming protrusion.

20. The slot-in type disk drive apparatus as claimed in claim 18, wherein the buffer recess further comprise a cam protrusion escaping recess which is disposed between the first contact end and the recess forming protrusion.

21. The slot-in type disk drive apparatus as claimed in claim 1, wherein:

the frame comprises a base frame which comprises a plurality of parts of the disk driving apparatus and a cover frame to cover the base frame;

a downward pressing member is disposed on an inside surface of the cover frame to downwardly press a center portion of the disk when the disk is chucked onto the chucking member; and an upward pressing member is disposed on the base frame to upwardly press the center portion of the disk when the disk is unchucked from the chucking member.

22. The slot-in type disk drive apparatus as claimed in claim 21, wherein the downward pressing member has a ring shape and the upward pressing member has a rod shape.

* * * * *